(12) United States Patent
Arnetoli

(10) Patent No.: US 11,109,530 B2
(45) Date of Patent: Sep. 7, 2021

(54) TRIMMER HEAD AND SPOOL FOR A TRIMMER HEAD

(71) Applicant: ARNETOLI MOTOR S.R.L., Reggello (IT)

(72) Inventor: Fabrizio Arnetoli, Reggello (IT)

(73) Assignee: ARNETOLI MOTOR S.R.L., Reggello (IT)

( * ) Notice: Subject to any disclaimer, the term of this patent is extended or adjusted under 35 U.S.C. 154(b) by 0 days.

(21) Appl. No.: 16/653,543

(22) Filed: Oct. 15, 2019

(65) Prior Publication Data

US 2020/0113131 A1    Apr. 16, 2020

(30) Foreign Application Priority Data

Oct. 16, 2018    (IT) .................. 102018000009483

(51) Int. Cl.
   *A01D 34/416*    (2006.01)

(52) U.S. Cl.
   CPC ..... *A01D 34/4166* (2013.01); *A01D 34/4163* (2013.01)

(58) Field of Classification Search
   CPC ................ A01D 34/4166; A01D 34/4163
   See application file for complete search history.

(56) References Cited

U.S. PATENT DOCUMENTS

| 8,230,602 | B2 | 7/2012 | Arnetoli | |
| 8,615,887 | B2 | 12/2013 | Arnetoli | |
| 10,517,210 | B2 * | 12/2019 | Cabrera | A01D 34/4166 |
| 2015/0271992 | A1 | 10/2015 | Nagoshi | |
| 2015/0342116 | A1 * | 12/2015 | Sprungman | A01D 34/4166 30/276 |
| 2018/0271012 | A1 | 9/2018 | Guo et al. | |

FOREIGN PATENT DOCUMENTS

| EP | 3 213 619 A1 | 9/2017 |
| EP | 3 384 752 A1 | 10/2018 |
| WO | 2017/059917 A1 | 4/2017 |

* cited by examiner

*Primary Examiner* — Omar Flores Sanchez
(74) *Attorney, Agent, or Firm* — McGlew and Tuttle, P.C.

(57) ABSTRACT

The trimmer head (1) includes a housing (3) and a spool (5) that can be housed in the housing. A pair of ring members (35A, 35B) with teeth inclined at opposite inclinations can be selectively coupled to the head, to engage the trimmer head (1) in combination with trimmer apparatuses having engine that rotates selectively in a clockwise or anticlockwise direction.

11 Claims, 25 Drawing Sheets

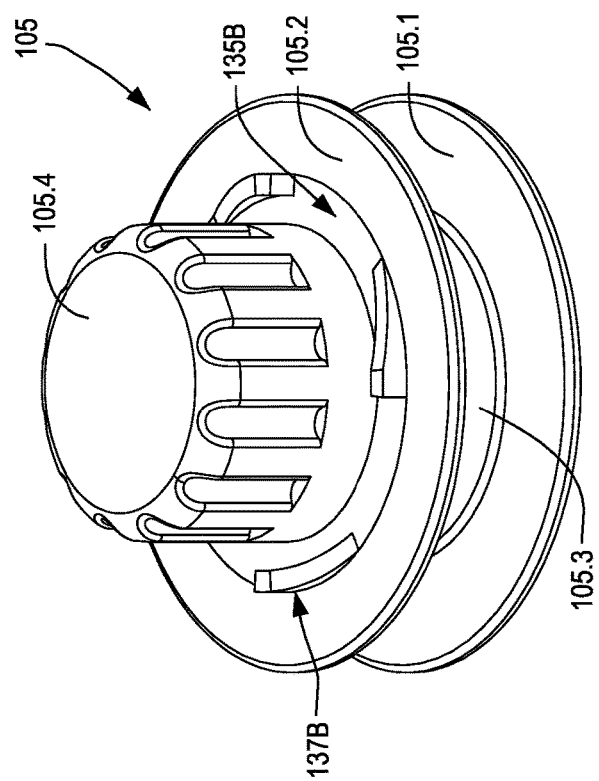
Fig.30
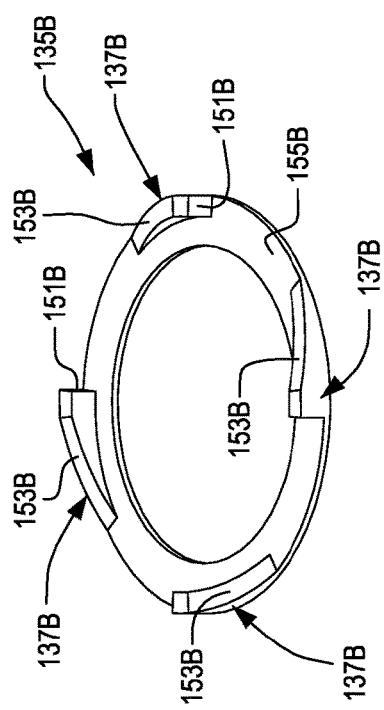
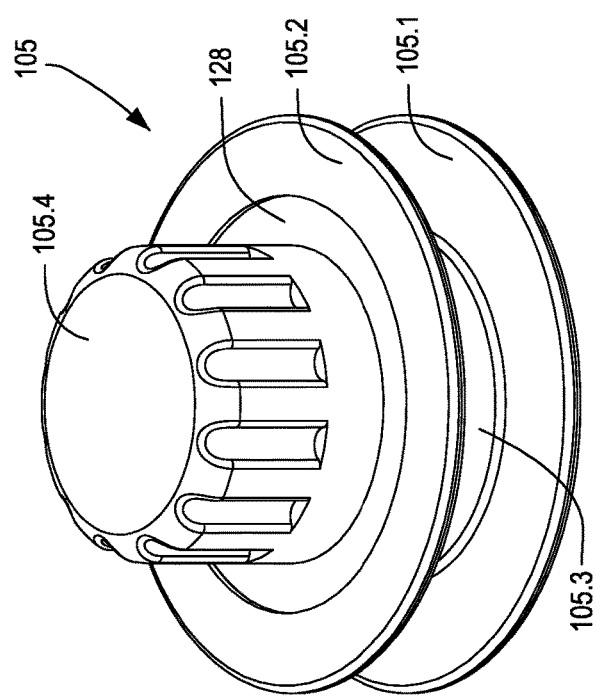
Fig.29

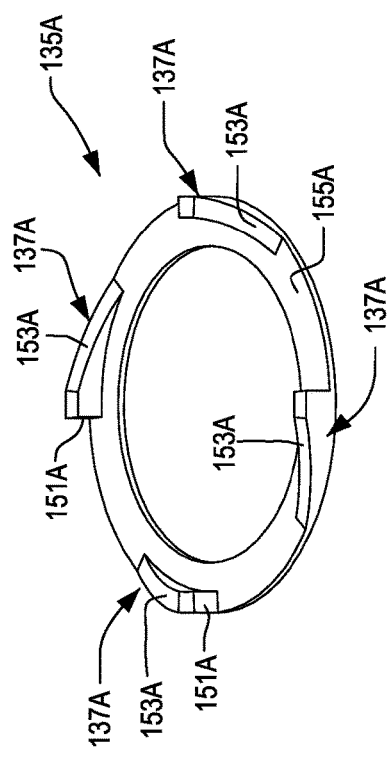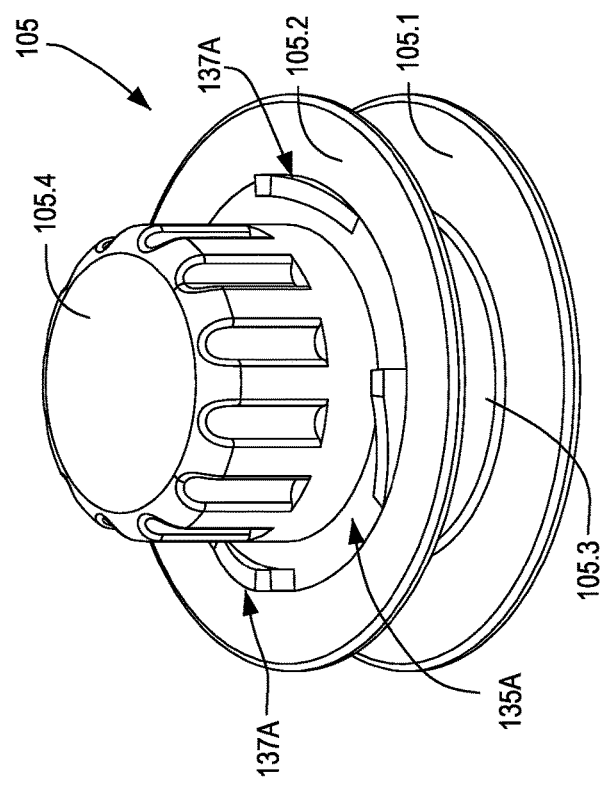
Fig.32
Fig.31

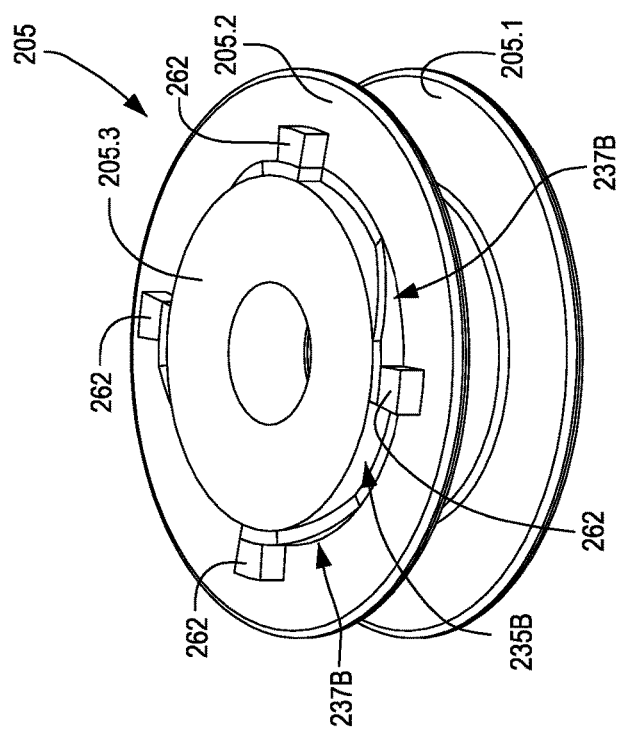
Fig.44
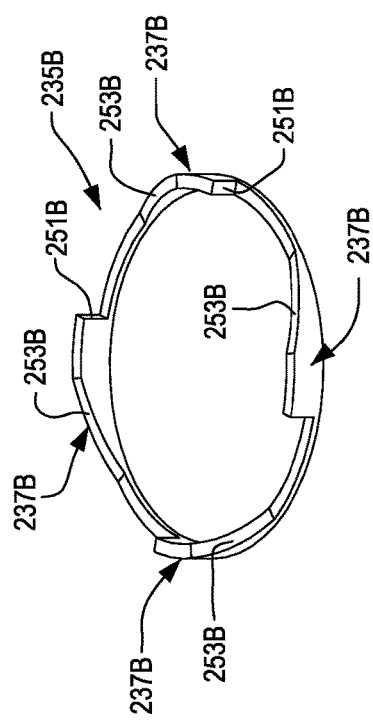
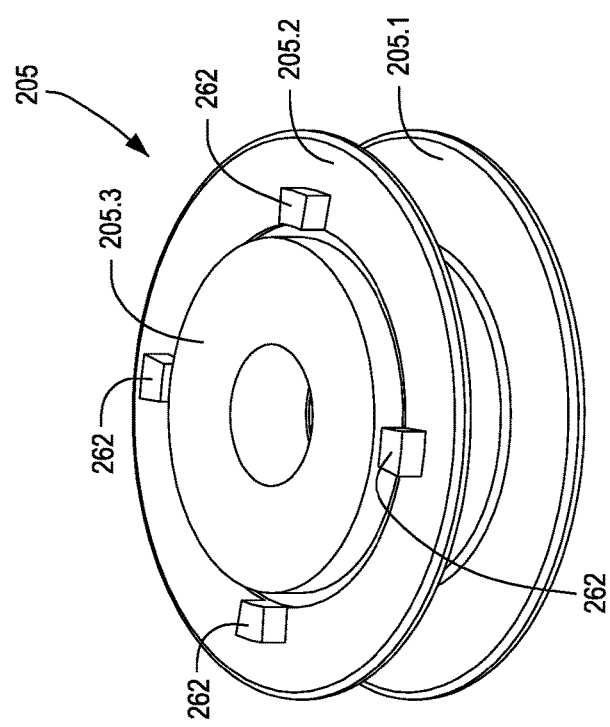
Fig.43

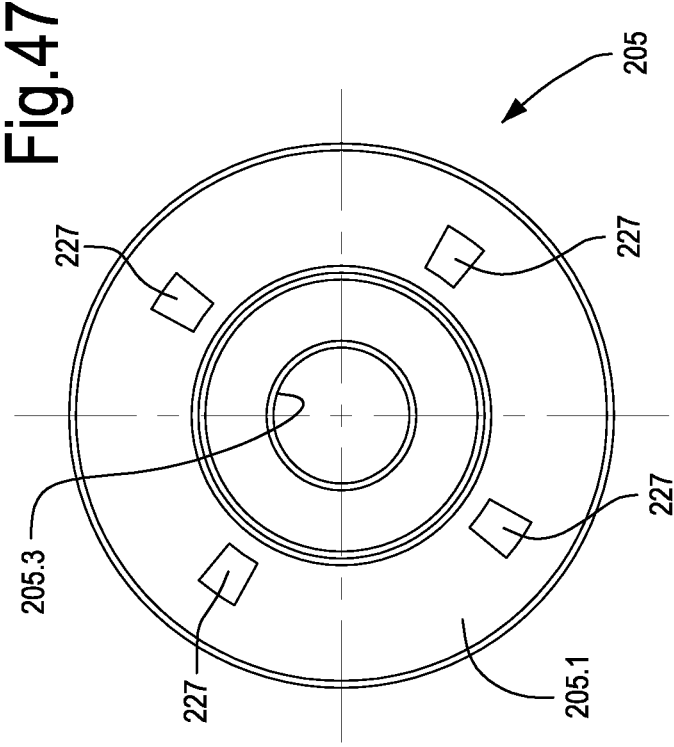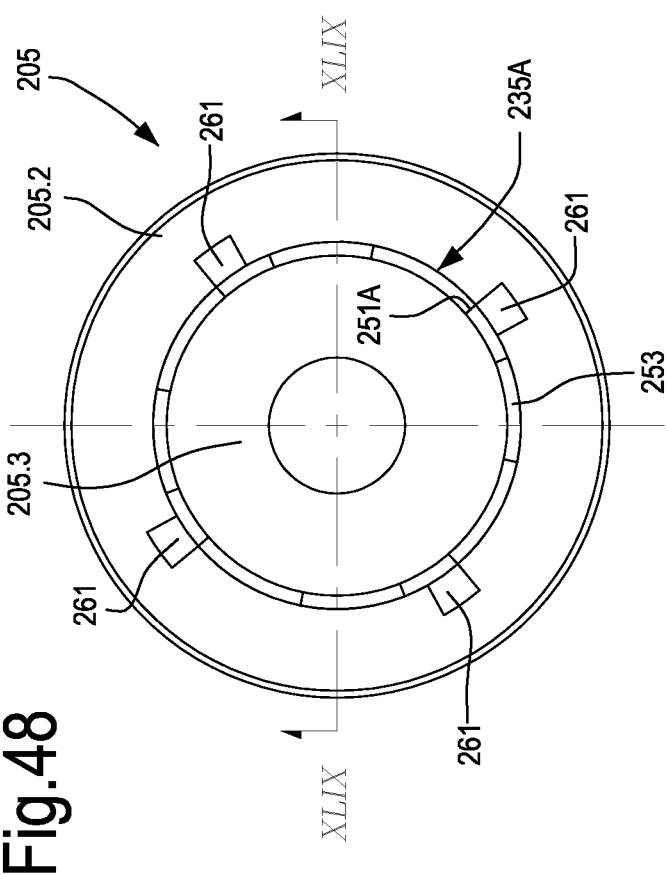

TRIMMER HEAD AND SPOOL FOR A TRIMMER HEAD

TECHNICAL FIELD

The present disclosure concerns gardening accessories. More specifically, the present disclosure concerns trimmer heads and in particular line trimmer heads.

BACKGROUND ART

Gardening trimmer heads are used for cutting grass and other vegetation. The trimmer heads are applied to the rotary shaft of a trimmer apparatus to rotate at high speed. A trimmer line, wound in a spool inside the head, projects from openings on the head and forms cutting members which are tensioned due to the centrifugal force. The line portions that project from the head are subject to wear and can break. When this happens, further trimmer line must be delivered in order to restore the projecting portion. When the line supply wound on the spool runs out, a new line supply must be wound in the head. This can be done without opening the trimmer head, by reciprocally rotating the housing and the spool positioned inside it. To rewind the trimmer line, the spool must be rotated in one single direction and not in the opposite direction, for example in a clockwise direction and not in an anticlockwise direction, or vice versa. The permitted direction of rotation depends on the rotation direction of the drive shaft to which the head is applied.

U.S. Pat. Nos. 8,615,887 and 8,230,602 disclose a reversible trimmer head, which can operate on trimmer apparatuses with drive shafts rotating alternatively clockwise or anticlockwise. To impart the right direction of rotation to the spool for reloading, a housing portion of the head has two sets of inclined teeth provided on opposite faces of the portion. One or the other sets of inclined teeth is selected, mounting the housing portion correspondingly, according to the rotation direction of the drive shaft to which the head is applied.

It is expedient to develop reversible trimmer heads which can rotate clockwise or anticlockwise and are more efficient than those known in the prior art.

SUMMARY

According to embodiments disclosed herein, a trimmer head for a trimmer apparatus is provided, comprising a housing with a first end wall and a second end wall, between which a side wall is arranged developing around a rotation axis of the housing. The end walls are transverse to the rotation axis. Openings for the exit of a trimmer line housed in the trimmer head extend through the side wall. The housing delimited by the first and second end wall and by the side wall houses a spool axially movable inside the housing and biased by a spring which co-acts with the spool and pushes the spool to a first operating position. The head furthermore comprises a first ring member, having a first set of inclined teeth and configured to be torsionally coupled to the housing or to the spool. The first set of teeth of the first ring member co-act with projections on the spool (if the ring member is fixed to the housing) or on the housing (if the ring member is fixed to the spool). The first set of inclined teeth and the projections are configured such that when the first ring member is torsionally coupled to the housing or to the spool, the first set of inclined teeth and the projections prevent rotation of the spool relative to the housing in a first direction and cause an axial displacement of the spool with respect to the housing against the action of the spring, away from the first operating position towards a second operating position when the spool rotates relative to the housing in a second rotation direction, opposite to the first rotation direction.

The axial displacement of the spool should be understood as a relative displacement between spool and housing. The trimmer head can be fixed to a drive shaft in different ways, alternatively locking the spool or the housing on the drive shaft. In the first case, the compression of the spring entails a movement of the housing with respect to the drive shaft. In the second case the compression of the spring entails a movement of the spool with respect to the drive shaft.

The trimmer head comprises a second ring member, having a second set of inclined teeth and configured to be torsionally coupled to the housing or to the spool.

The second set of teeth of the second ring member cooperate with projections on the spool (if the second ring member is fixed to the housing) or on the housing (if the second ring member is fixed to the spool). The second set of inclined teeth and the projections are configured such that when the second ring member is torsionally coupled to the housing or to the spool, the second set of inclined teeth and the projections prevent rotation of the spool with respect to the housing in the second direction and cause an axial displacement of the spool with respect to the housing against the action of the spring, away from the first operating position towards a second operating position when the spool rotates with respect to the housing in the first rotation direction.

A kit or a system is thus obtained comprising the two ring members, the housing and the spool, with which the trimmer head can be fitted to be mounted alternatively on a trimmer apparatus with engine rotating clockwise or anticlockwise. According to the rotation direction of the trimmer apparatus engine, one or the other of the two ring members is selected, and is torsionally coupled to the housing of the head, or to the spool of the head. The coupling can be reversible or irreversible.

According to another aspect, a spool for a line trimmer head is disclosed, comprising a central body, at least one flange projecting from the central body and a ring member couplable to the flange, said ring member comprising a set of inclined teeth projecting from the flange when the ring member is coupled to it.

Preferably the spool has two flanges projecting from the central body and defining between them a winding volume for the trimmer line. On one flange a coupling for the ring member can be provided, for example an annular seat or annular groove, on a surface of the flange opposite the winding volume. On the other flange, projections can be provided arranged on the surface thereof opposite the winding volume.

In some embodiments the spool can have a portion projecting from the flange to which the ring member can be coupled, said projecting portion forming an operating knob to act on the spool when it is housed inside a trimmer head housing.

In other embodiments, the spool can have a connection element to a shaft of a trimmer apparatus or another operating machine, to receive the rotation movement.

According to a further aspect, a kit is disclosed, comprising a spool of the type disclosed above, and two ring members, selectively couplable with the spool and each provided with inclined teeth. The two ring members differ from each other in the orientation of the inclination of the teeth. In practice, each tooth has an inclined edge or inclined surface that forms a sliding ramp on abutments or projections formed on a part of the housing of the trimmer head in which the spool is employed. The inclination of the teeth is opposite on the two ring members to allow use of the spool in machines or trimmer apparatuses with clockwise or anticlockwise rotation, selectively.

BRIEF DESCRIPTION OF THE DRAWINGS

The invention will be better understood by following the description and attached drawings, which illustrate an exemplifying non-limiting embodiment of the invention. More in particular:

FIG. 29 illustrates an exploded view of a spool in a further embodiment;

FIG. 30 illustrates the spool of FIG. 29 mounted with a first ring member;

FIGS. 31 and 32 illustrate isometric views analogous to the views of FIGS. 29 and 30 with a second ring member;

FIGS. 43 and 44 illustrate respectively an exploded isometric view and a mounted view of a spool in a further embodiment, with a first ring member;

FIGS. 47 and 48 illustrate bottom and top views respectively of the spool of FIGS. 45 and 46;

FIG. 49 illustrates a section according to the line XLIX-XLIX of FIG. 48;

DETAILED DISCLOSURE

Figure 1:
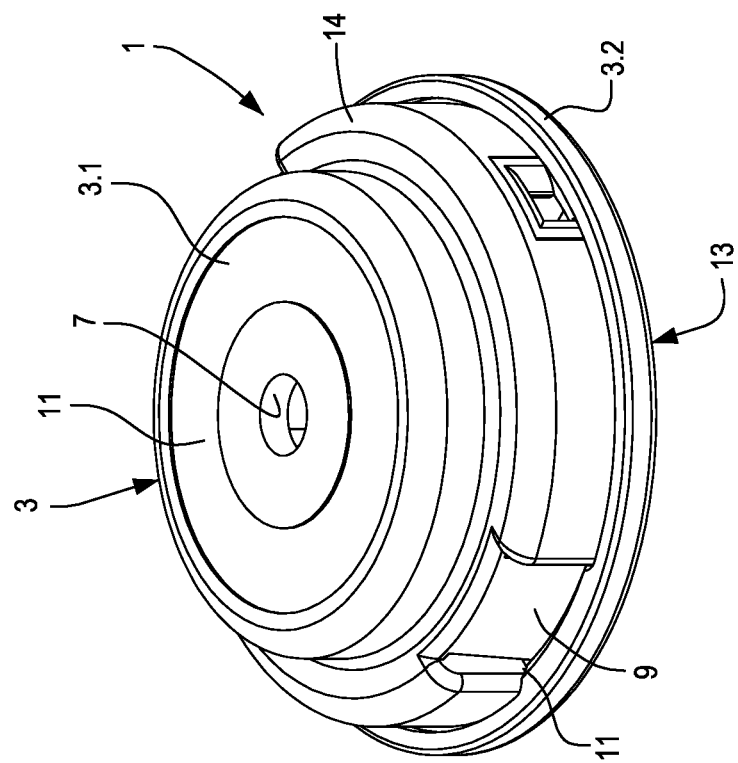
FIG. 1 illustrates a trimmer head in a first embodiment in an isometric view.
Figure 2:
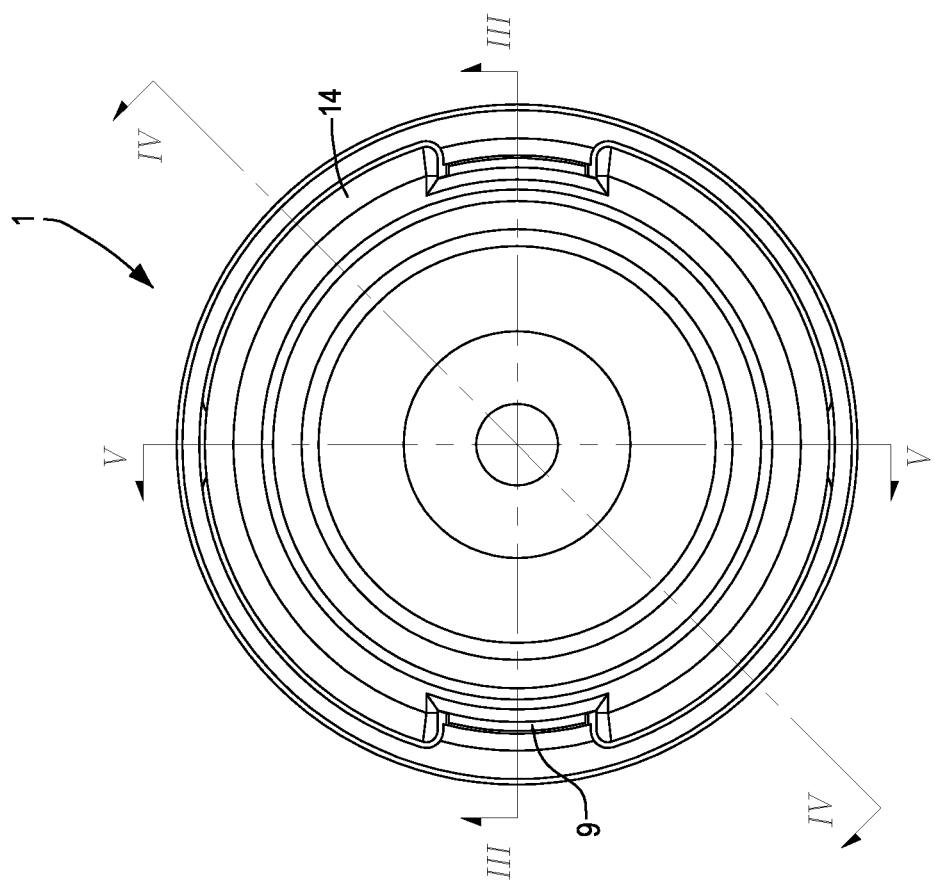
FIG. 2 illustrates a plan view of the head of FIG. 1.
Figure 6:
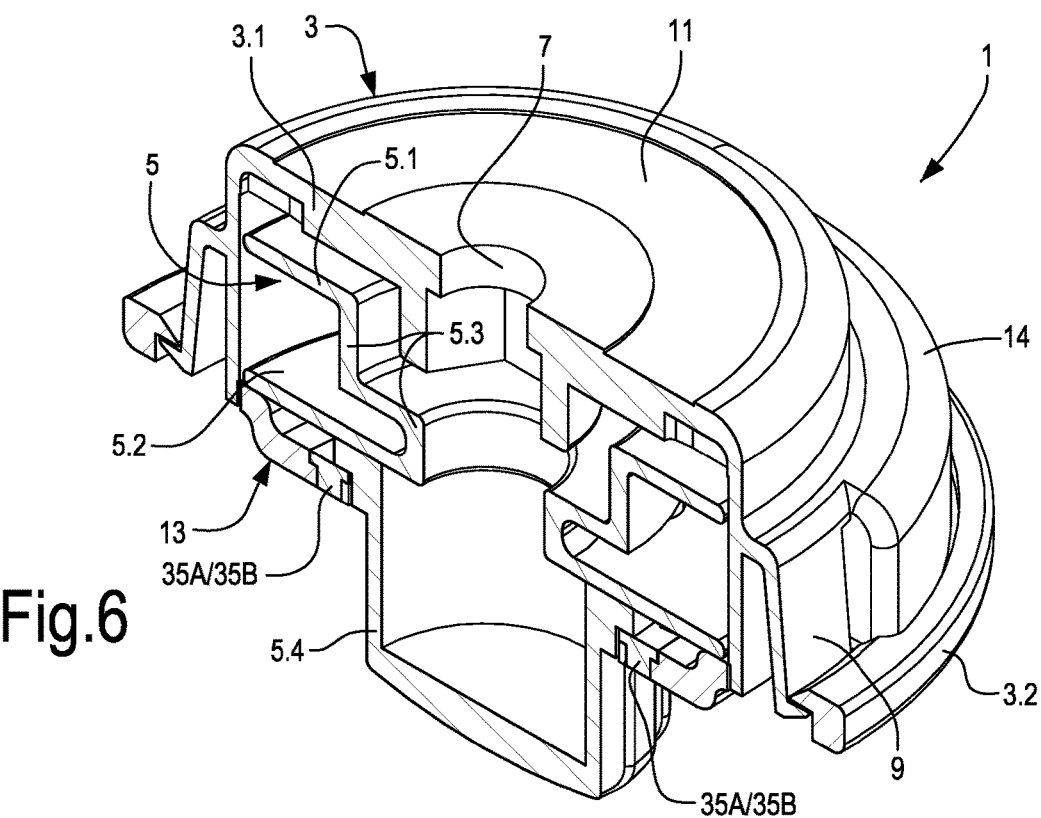
FIGS. 6, 7 and 8 illustrate isometric views sectioned along the same planes IV-IV and V-V of FIG. 2.
Figure 3:
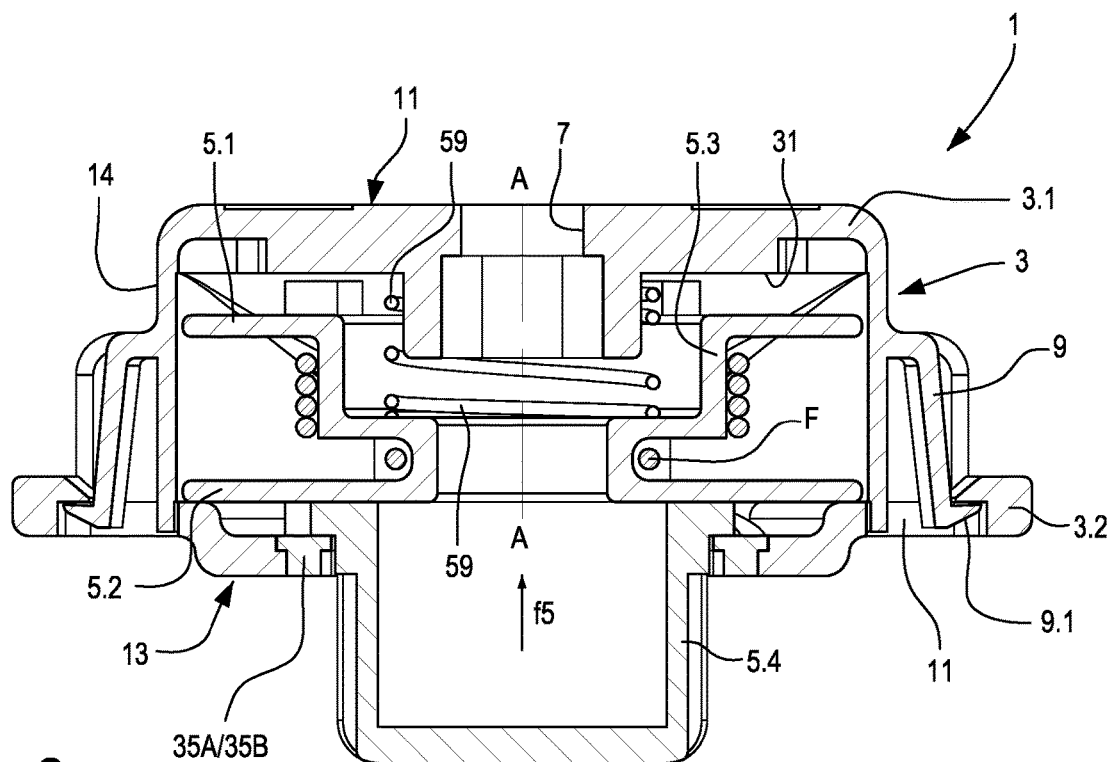
FIGS. 3, 4 and 5 illustrate sections according to the lines IV-IV and V-V of FIG. 2.
Figure 7:
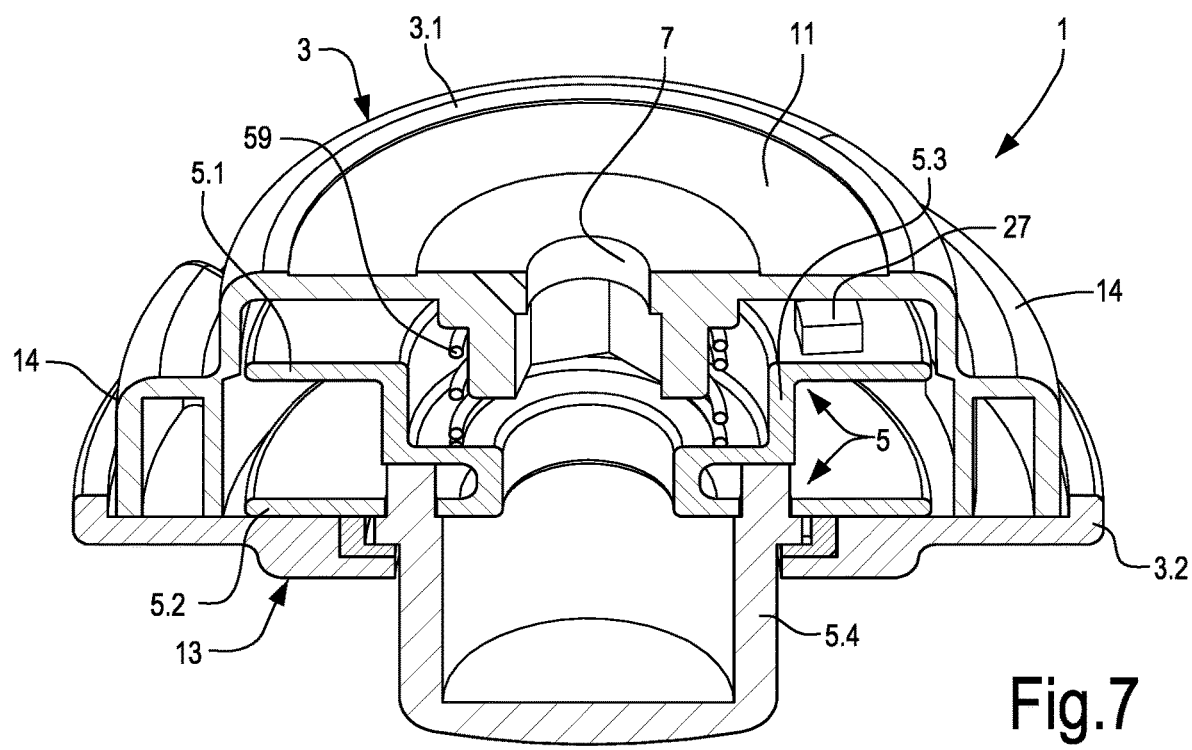
Figure 4:
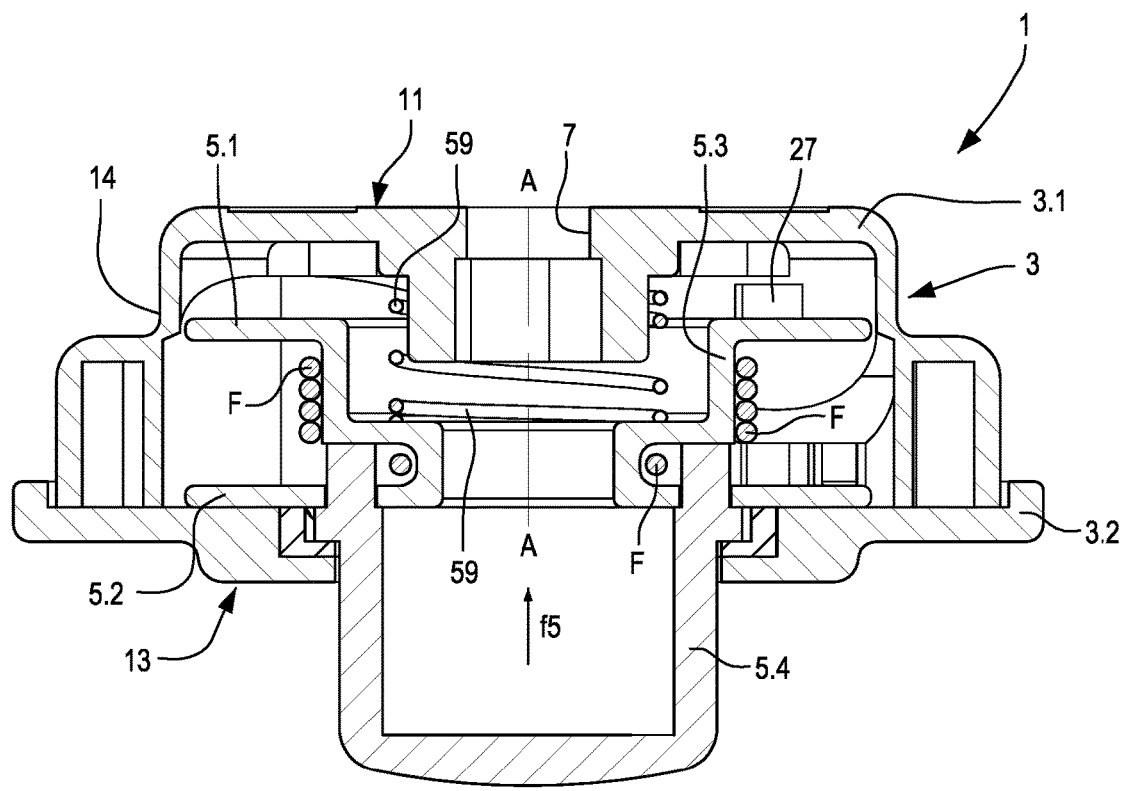

A first embodiment of a trimmer head according to the present disclosure is illustrated in FIGS. 1 to 21.

More in particular FIGS. 1 to 8 show the trimmer head overall with a spool mounted inside it, while FIGS. 9 to 14 illustrate the spool separate from the trimmer head housing and FIGS. 15 to 21 illustrate the lower portion or lid of the trimmer head housing with assembled thereon one or the other of the two ring members that provide the inclined teeth with which the spool cooperates.

With initial reference to FIGS. 1 to 8, in one embodiment the trimmer head, indicated overall by 1, comprises a housing 3, inside which a spool 5 is arranged, on which a trimmer line is wound forming a plurality of coils inside a winding space formed in the spool 5. The trimmer line is shown schematically only in FIG. 5 and indicated therein by F.

In some embodiments, as illustrated in the drawing, the housing 3 comprises a first portion 3.1, below referred to as upper portion 3.1, and a second portion 3.2, below referred to as lower portion 3.2. The terms upper and lower indicate the orientation of the portions of housing 3 with respect to the position assumed by the head 1 when the latter is working, mounted on a drive shaft of a trimmer apparatus, not shown. In other embodiments the portions 3.1 and 3.2 can be positioned in reverse, with the portion 3.1 positioned at the bottom and the portion 3.2 positioned at the top.

In the illustrated embodiment, the upper portion 3.1 comprises a central cavity 7 in which a locking pin can be inserted, locking the trimmer head to the shaft of the trimmer apparatus, not shown. A-A indicates a rotation axis of the trimmer head 1.

In some embodiments, the portion 3.1 and the portion 3.2, below referred to also as "lid", can be coupled to each other in a reversible manner by any connection system. For example, the two portions 3.1 and 3.2 of the housing 3 can be joined to each other by means of a snap or elastic coupling. The elastic coupling can be formed of elastic tabs 9 integral with the upper portion 3.1 of the housing 3. The tabs 9 can be inserted in openings 11 provided along the perimeter edge of the lid or lower portion 3.2. The connection can be guaranteed by teeth 9.1 of the elastic tabs 9.

By coupling the two portions 3.1 and 3.2 of the housing 3 to each other, a housing 3 is obtained which has an upper wall 11 and a lower wall 13, also called first end wall and second end wall. Between the first end wall 11 and the second end wall 13, which can extend approximately orthogonal to the rotation axis A-A, a side wall develops which, in the example illustrated, is formed mainly of the upper portion 3.1 of the housing. The side wall, which can advantageously have an asymmetrical development around the rotation axis A-A, is indicated overall by 14.

The side wall 14 has openings 15 for the passage of the trimmer line F. In the embodiment illustrated, the side wall 14 has two openings 15 for the passage of two ends of the trimmer line F. As can be seen in particular in FIG. 5, the trimmer line F is wound in coils around the body of the spool 5 and projects with two end portions from the openings 15. The portions of trimmer line F which project from the trimmer head 1 constitute cutting elements for cutting the vegetation on which the trimmer head 1 acts when rapidly rotating around the rotation axis A-A thereof by the trimmer apparatus, not shown, on which the trimmer head 1 is mounted.

In the illustrated embodiment, the spool 5 comprises a first flange 5.1 and a second flange 5.2. The first flange 5.1 and the second flange 5.2 define between them a volume accommodating the coils of trimmer line F wound inside the housing 3 of the trimmer head 1. The flanges 5.1 and 5.2 can project from a central body 5.3 of the spool. The flanges 5.1 and 5.2 together with the central body 5.3 can be made as one single body, for example in molded polymeric material.

Figure 15:
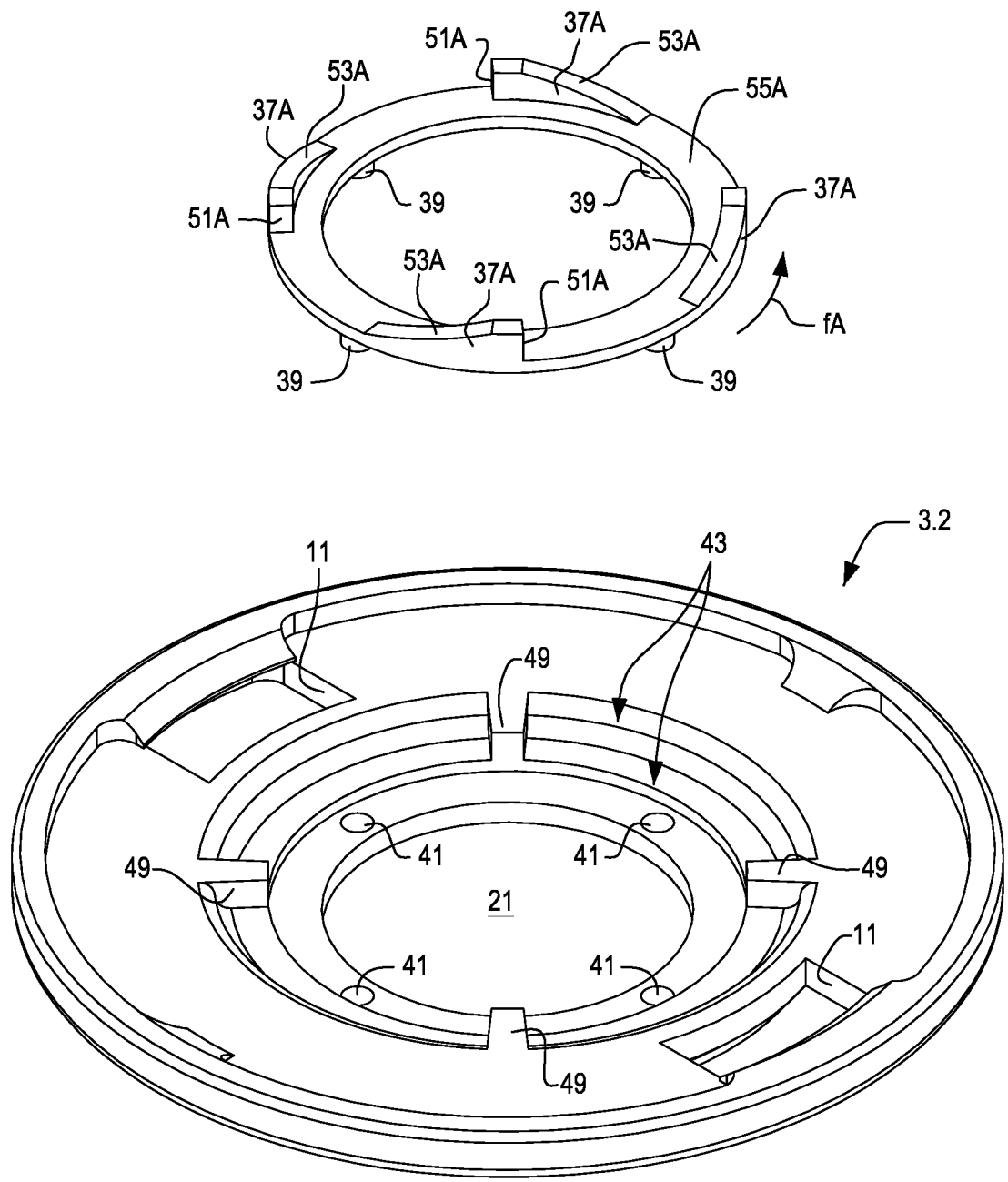
FIG. 15 illustrates an exploded isometric view of the lower component of the trimmer head of FIGS. 1 to 14 with a first ring member.

In some embodiments, the spool 5 comprises a lower portion 5.4 which projects from the housing 3 of the trimmer head 1 through a central opening 21, shown in particular in the view of the lower portion 3.1 of the housing in FIG. 15.

The portion 5.4 of the spool 5 projecting at the bottom from the lid or lower portion 3.2 of the housing 3 of the trimmer head 1 forms a knob which can be pressed and pushed according to the arrow f5 (FIG. 5) in order to axially displace the spool 5 within the housing 3 for the purposes described herein.

In the illustrated embodiment, the lower portion 5.4 of the spool 5 is made as an element separate from a main body that comprises the two flanges 5.1 and 5.2 and the central body 5.3 of the spool 5. The two components 5.4 and 5.1, 5.2, 5.3 of the spool 5 can be coupled by means of pins 23 (FIG. 10) integral with the portion 5.4 of the spool, which are inserted in openings 25 provided in the opposite main body of the spool and open on the lower flange 5.2. The coupling between the two portions forming the spool 5 can be reversible, for example by interlock with slight interference, or irreversible, for example by interlock with high interference, with reciprocal gluing or welding of the pins 23 in the openings or holes 25.

On the faces of the flanges 5.1 and 5.2 opposite with respect to the volume defined between them, and within which the trimmer line F is wound, respective projections 27 and 29 are provided. The projections 27 and 29 can be seen in particular in FIGS. 10 to 14. The projections 27 provided on the outer face of the upper flange 5.1 co-act with abutments or projections 31 formed on the inner surface of the end wall 11 of the upper portion 3.1 of the housing 3. The projections 29 co-act, vice versa, with inclined teeth described in detail below and provided on one or the other of two ring members 35A, 35B, also described in detail below.

With reference to FIG. 15, for example, a first ring member 35A is shown disassembled with respect to the lower portion 3.2 of the housing 3 of the trimmer head 1.

On one annular face or surface 55A of the ring member 35A inclined teeth 37A are provided. In the illustrated embodiment four equidistant teeth 37A are provided, but their number is an example and corresponds to the number of projections 29 formed on the flange 5.2 of the spool 5. On the opposite face, with respect to the inclined teeth 37A, the first ring member 35A comprises pins 39 which serve to couple in a reversible manner the first ring member 35A to the lower portion or lid 3.2 of the housing 3 of the trimmer head 1. The coupling is obtained by inserting the pins 39 in corresponding holes 41 provided in the lid 3.2, shown for example in FIG. 15. The holes 41 are preferably through holes, which extend to the outer surface of the lower portion or lid 3.2 of the housing 3.

Figure 8:
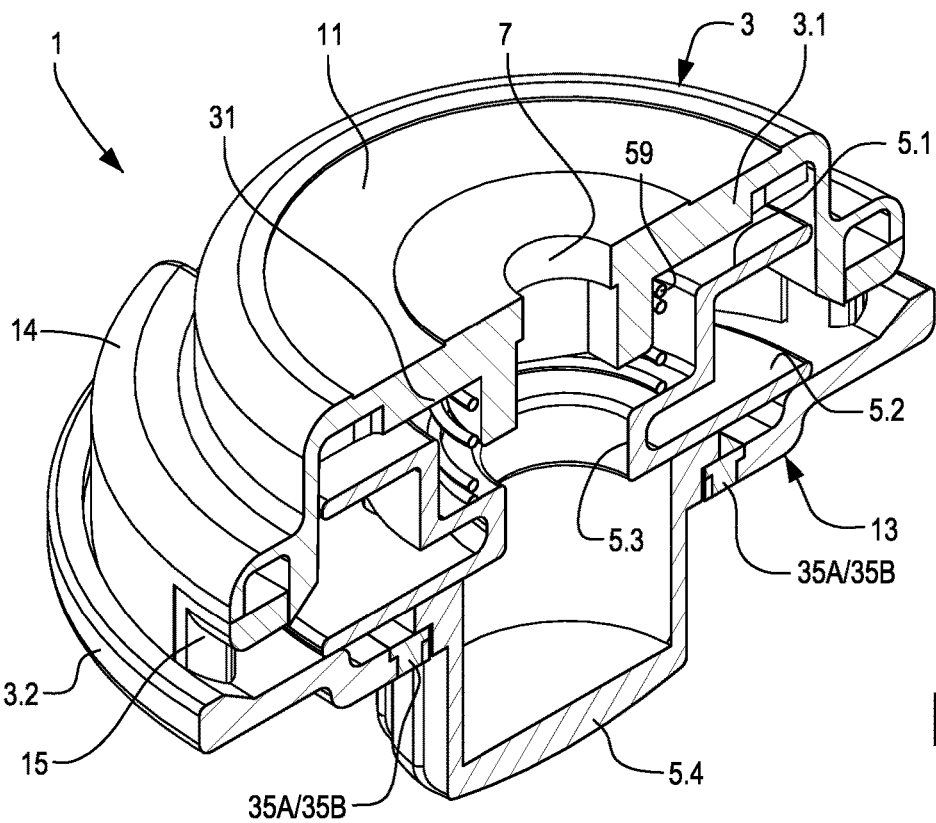
Figure 5:
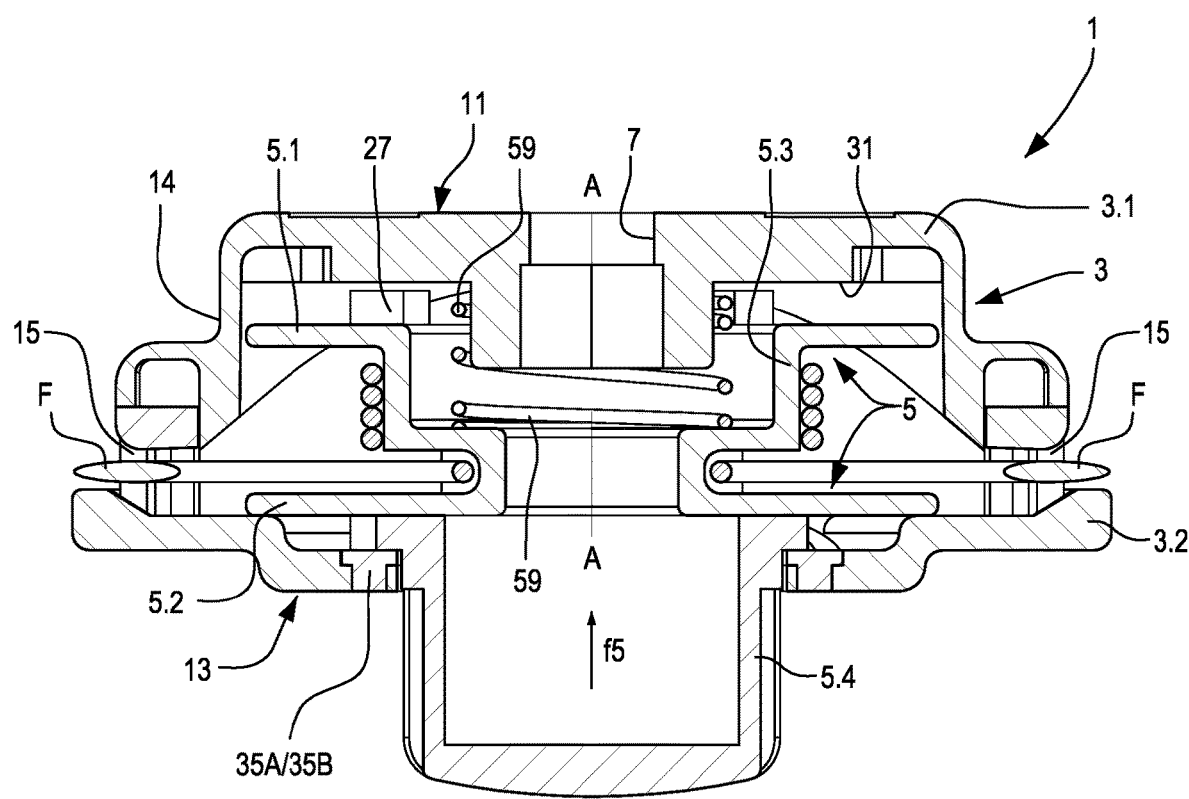
Figure 9:
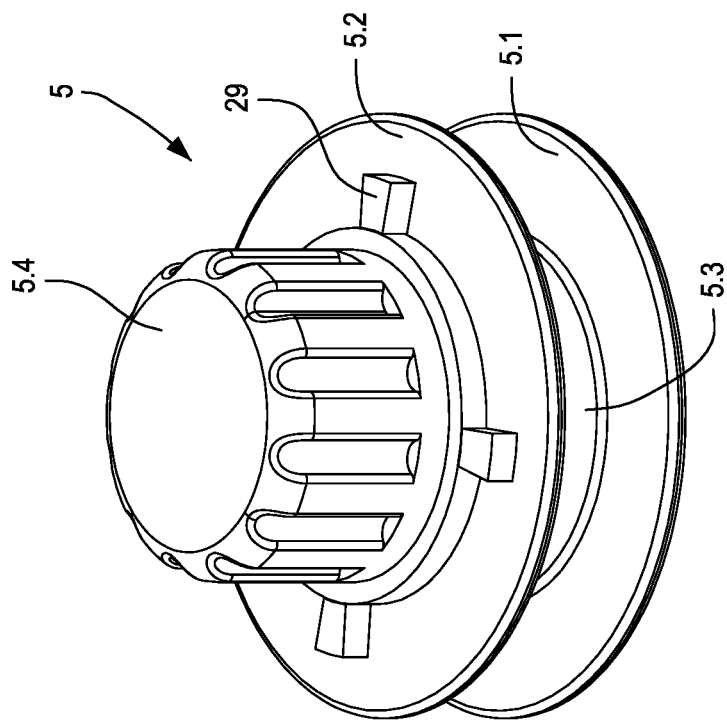
FIG. 9 illustrates an isometric view of the spool of the head of FIGS. 1 to 8.
Figure 10:
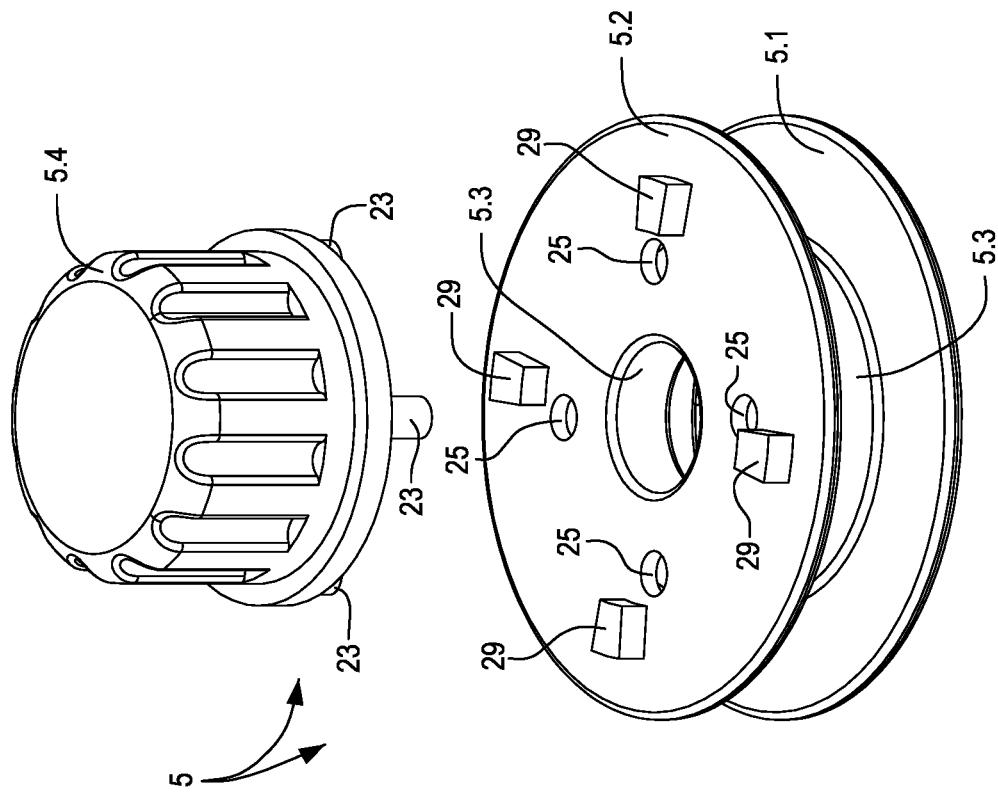
FIG. 10 illustrates an exploded isometric view of the spool of FIG. 9.
Figure 11:
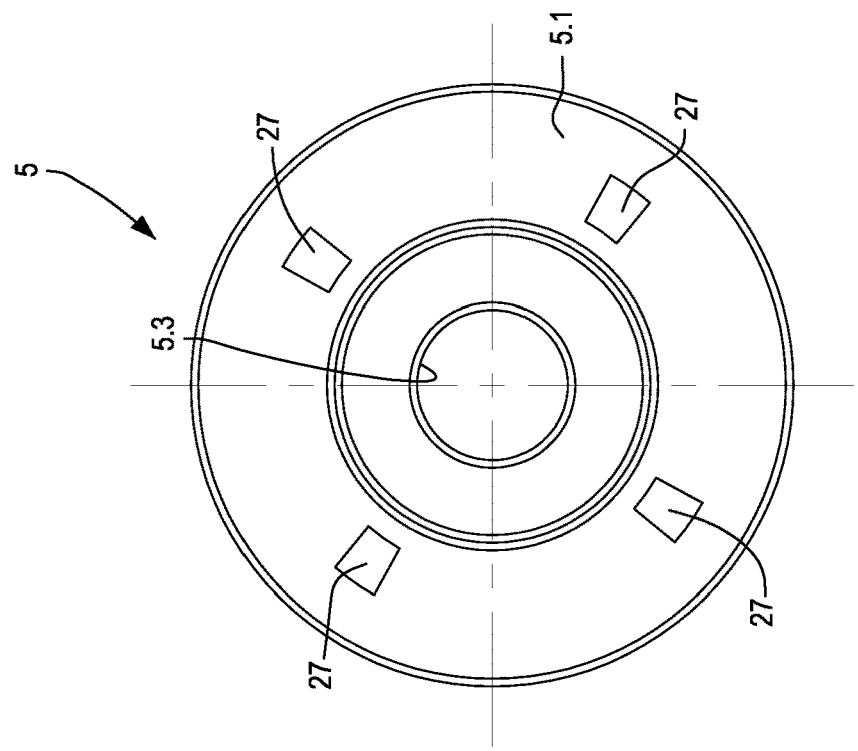
FIGS. 11 and 12 illustrate bottom and top views of the spool of FIGS. 9 and 10.
Figure 12:
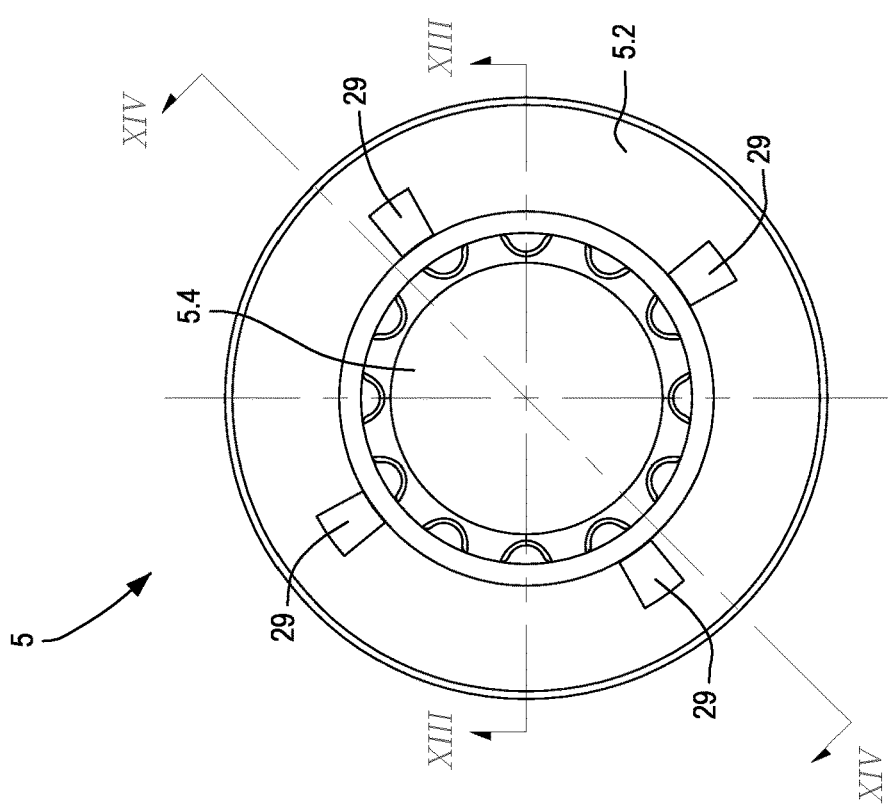
Figure 14:
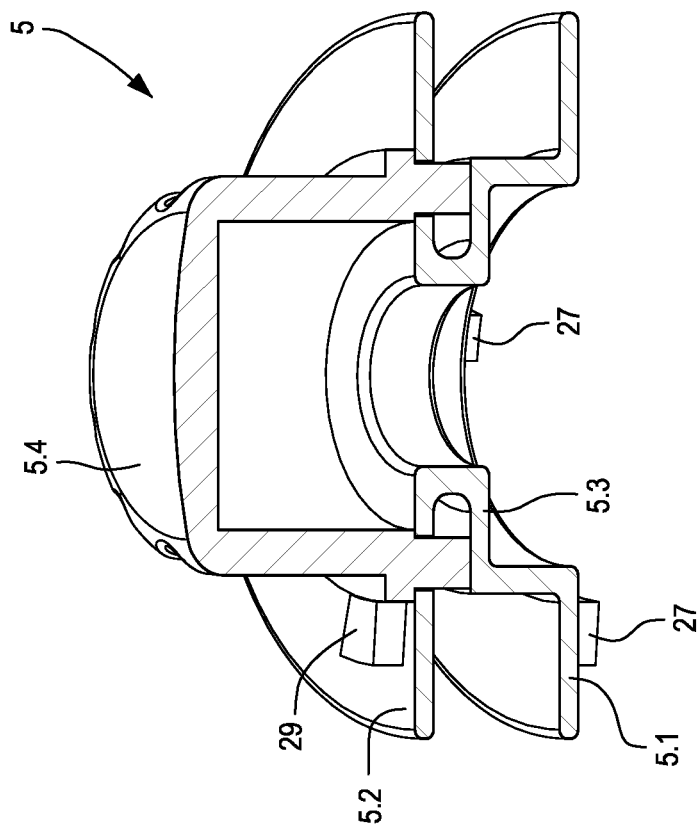
FIGS. 13 and 14 illustrate sections in isometric view along the lines XIII-XIII and XIV-XIV of FIG. 12.
Figure 13:
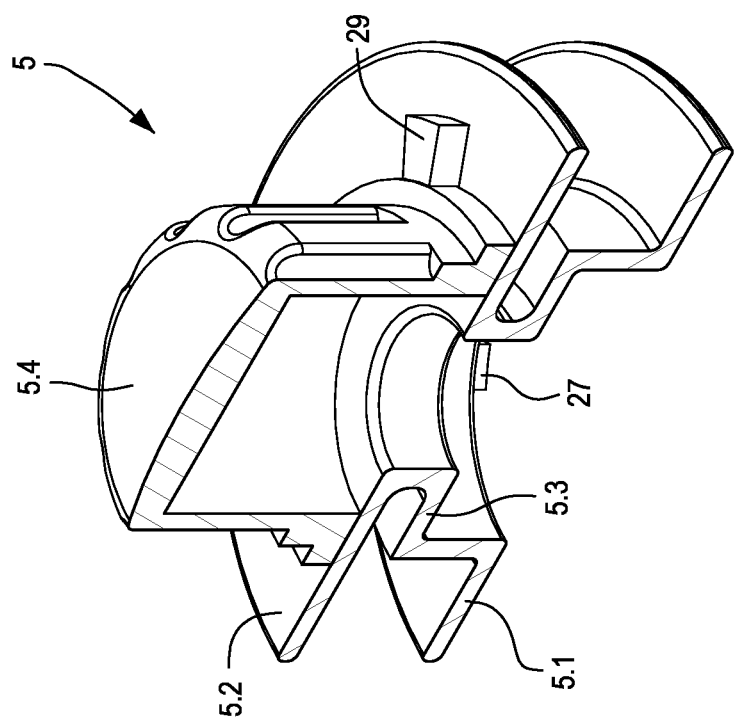
Figure 18:
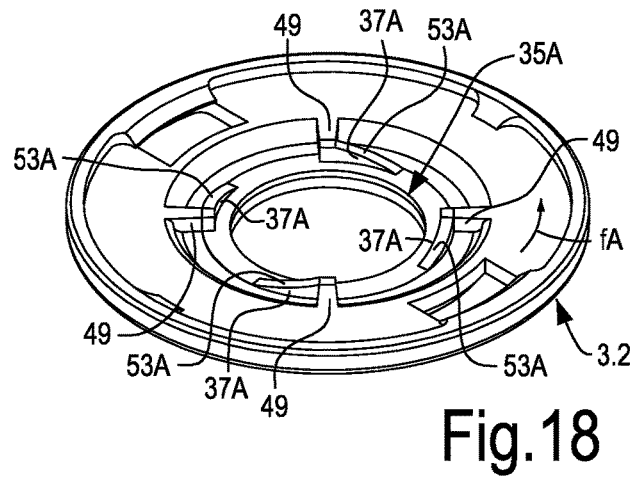
FIGS. 18 and 19 show isometric views corresponding to FIGS. 16 and 17.
Figure 16:
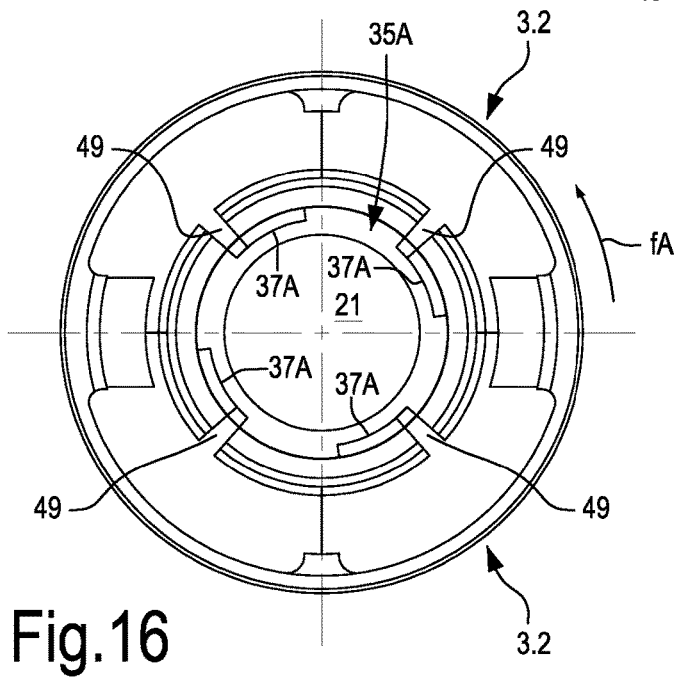
FIGS. 16 and 17 show plan views of the lower portion of FIG. 15 with the first ring member and the second ring member mounted, respectively.

As can be seen in FIGS. 5, 8, 9 and in particular in FIG. 15, the first ring member 35A is housed in a central seat or central impression 43 formed inside the lid or lower portion 3.2 of the housing 3. FIG. 18 shows in an isometric view and FIG. 16 shows in an overhead plan view the lower portion 3.2 with the first ring member 35A mounted in the impression or central seat 43. As can be seen in particular in FIGS. 16 and 18, when the ring member 35A is mounted in the central seat 43 of the lower portion or lid 3.2, the inclined teeth 37A are aligned with projections 49 integral with the lower portion 3.2 and preferably made in one piece with it, for example in molded polymeric material.

When assembled, the ring member 35A and the lid or lower portion 3.2 of the housing 3 substantially form one single component, in which the projections 49 form a radial continuation of the inclined teeth 37A.

Each of the inclined teeth 37A has an edge or surface 51A lying on a plane containing the axis of symmetry of the ring member 35A. In practice the edge or surface 51A is substantially orthogonal to the plane on which an annular surface 55A lies, from which the inclined teeth 37A extend. Each inclined tooth 37A furthermore comprises an inclined edge or inclined surface 53A, which forms an ascent ramp developing from the annular surface 55A to a distance from said surface corresponding to the axial extension of the edge 51A.

The function of the ring member 35A will be described further on.

In addition to the spool 5 the housing 3 of the trimmer head 1 houses an elastic member 59, shown in particular in FIGS. 4 to 8. In the illustrated embodiment the elastic member comprises a compression spring 59 and more in particular a helical compression spring that reacts between the inner surface of the end wall 11 of the trimmer head 1 and an annular abutment formed by the central body 5.3 of the spool 5. In this way, when the trimmer head 1 is mounted, the spool 5 is elastically biased by the compression spring 59 in a first operating position, in which the spool is in abutment against the lid or lower portion 3.2 of the housing 3 and the portion 5.4 of the spool 5 is in the position of maximum projection with respect to the housing 3 of the trimmer head 1. In this position the projections 27 of the spool 5 are spaced with respect to the abutments 31 of the upper portion 3.1 of the housing 3, while the underlying projections 29 are resting with the surface 55A of the ring member 35A between consecutive inclined teeth 37A.

As can be seen, for example, in FIG. 5 in combination with FIGS. 15, 16 and 18, the spool 5 can be made to rotate about the axis A-A of the trimmer head 1 with respect to the housing 3. The rotation is permitted only in one direction, indicated by the arrow fA in FIGS. 15, 16 and 18. While the spool rotates in an anticlockwise direction according to the arrow fA, the projections 29 provided on the outer face of the lower flange 5.2 of the spool 5 meet the inclined surface or inclined edge 53A of the respective inclined teeth 37A, thus permitting rotation. The surface or edge 53A forms a ramp on which the projections 29 can slide if sufficient torque is applied to the spool 5 to cause it to rotate with respect to the housing 3. The rotation torque must overcome the friction force between the inclined teeth 37A and the projections 29 of the spool 5.

Due to the inclination of the inclined surfaces or inclined edges 53A and the sliding of the projections 29 along them, such rotation results in movement of the spool 5 inside the housing 3 according to arrow f5 in an axial direction with consequent compression of the compression spring 59. When the projections 29 are in the position farthest from the annular surface 55A of the ring member 35A, the spool 5 has reached its second operating position, closest to the end wall 11, corresponding to maximum compression of the spring 59. Continuing the rotation according to the arrow fA of the spool 5 with respect to the housing 3, the projections 29 disengage from the inclined teeth 37A and this causes the compressed spring 59 to push the spool 5 back towards its first operating position, against the lower portion or lid 3.2 of the housing 3.

The inclined surfaces or inclined edges 53A of the inclined teeth 37A can have an inclination, with respect to the plane on which the annular surface 55A lies, smaller than 90° and larger than 0°, for example between about 5° and about 30°.

The relative rotation between the spool 5 and the housing 3 serves for example to wind a supply of trimmer line F around the spool 5 without having to open the housing 3. In fact, it is sufficient to introduce the line F radially through the openings 15, constrain said line to the spool 5 by means of known systems, and rotate the spool 5 with respect to the housing 3.

An inverse rotation (namely in direction opposite to the arrow fA of FIG. 15) of the spool 5 with respect to the housing 3 is prevented by the presence of the abutments 51A formed by the edges of the inclined teeth 37A orthogonal to the annular surface 55A.

The cooperation between the projections 29 and the abutments 51A of the first ring member 35A is such that when the trimmer head 1 is caused to rapidly rotate by the trimmer apparatus, the housing 3 rotates integrally with the spool 5 about the rotation axis A-A. Obviously, the rotation direction of the trimmer head 1 must be consistent with the shape of the inclined teeth 37A. In other words, the rotation direction of the trimmer head 1 due to rotation of the trimmer apparatus is such as to induce the spool 5 to rotate in the direction opposite to the direction indicated by the arrow fA. If this rotation were not prevented by the presence of the abutments 51A co-acting with the projections 29, it would cause uncontrolled unwinding of the trimmer line F and complete exit thereof through the openings 15 of the housing 3 of the trimmer head 1.

To obtain a controlled elongation of the trimmer line F, for example to restore the portions of trimmer line F projecting from the head 1 through the openings 15, the spool 5 is controlled by means of the lower portion 5.4 projecting from the housing 3 when the trimmer head 1 is rotating about its own axis A-A. Alternately pressing the lower portion 5.4 of the spool 5 against the ground while the trimmer head 1 is rotating causes a temporary compression of the spring 59 and therefore an axial displacement of the spool 5 in the direction of the arrow f5 with respect to the housing 3. This movement causes release of the projections 29 from the abutments 51A and engagement of the projections 27 with the abutments 31 formed on the inner surface of the first end wall 11. The abutments 31 are angularly offset with respect to the abutments 51A, or vice versa the projections 29 are angularly offset with respect to the projections 27. In this way, repeatedly pressing the spool 5 to make it move alternately according to the arrow f5 inside the housing 3 produces cyclic limited rotation movements of the spool 5 inside the housing 3 due to the centrifugal force acting on the trimmer line F which projects from the openings 15, resulting in controlled delivery (controlled unwinding) of the trimmer line F with respect to the spool 5.

Advantageously, as can be seen in particular in FIG. 15, the abutments 51A formed by each inclined tooth 37A are aligned with the projections 49 when the ring member 35A is mounted in the lower portion or lid 3.2 of the housing 3. The reciprocal position of the projections 49 and of the abutment surfaces 51A can be seen in particular in FIG. 18. In this way the radial dimension of the abutment surface 51A of the inclined teeth 37A is effectively increased by the extension provided by the corresponding projections 49. In this way a large supporting and abutment surface of the projections 29 against the abutment surfaces 49-51A is obtained.

As previously described, the inclined teeth 37A allow anticlockwise rotation (in the example) of the spool 5 with respect to the housing 3, but only allow rotation in the reverse direction after a pressure against the lower portion 5.4 which causes release of the projections 29 from the inclined teeth 37A. This is a consequence of the particular contour of the inclined teeth 37A and in particular of the inclined surfaces or edges 53A of it.

If the trimmer head 1 has to be mounted on the shaft of a trimmer apparatus that rotates in A direction opposite to the one considered so far, the inclined teeth that co-act with the abutments 29 must allow a reciprocal rotation of the spool 5 with respect to the housing 3 in a clockwise direction and prevent it in an anticlockwise direction. To obtain this result the first ring member 35A, shown in particular in FIG. 15, must be replaced with a ring member 35B, shown in particular in FIGS. 17 and 19. The ring member 35B is substantially equal to the ring member 35A, except that the inclined teeth, indicated here by 37B, have a shape symmetrical to that of the inclined teeth 37A, namely the inclined surface or ramp, indicated here by 53B, is oriented opposite to the ramp or inclined surface 53A of the first ring member 35A.

Figure 19:
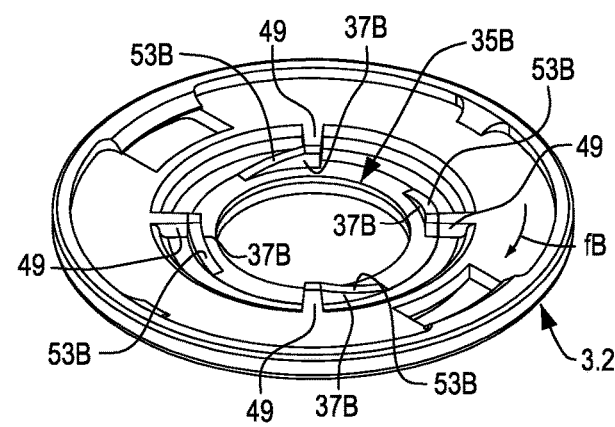
Figure 17:
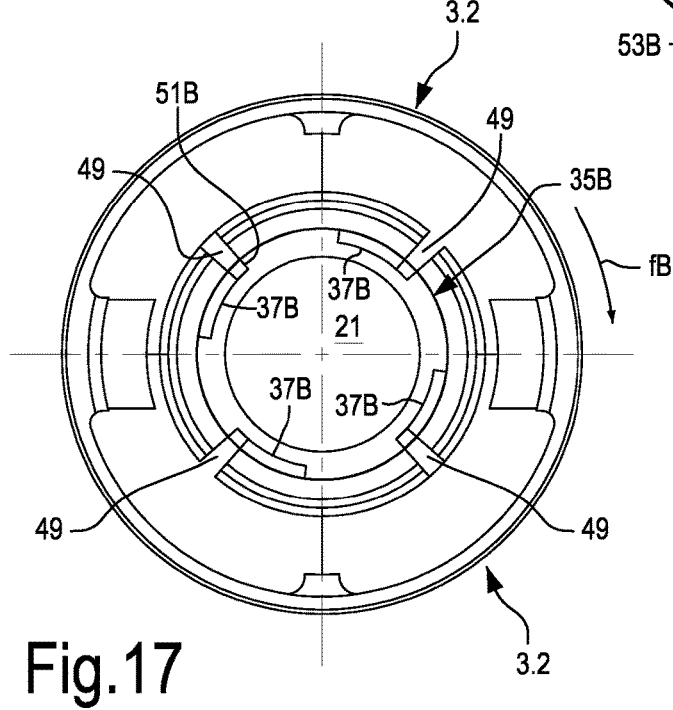
Figure 22:
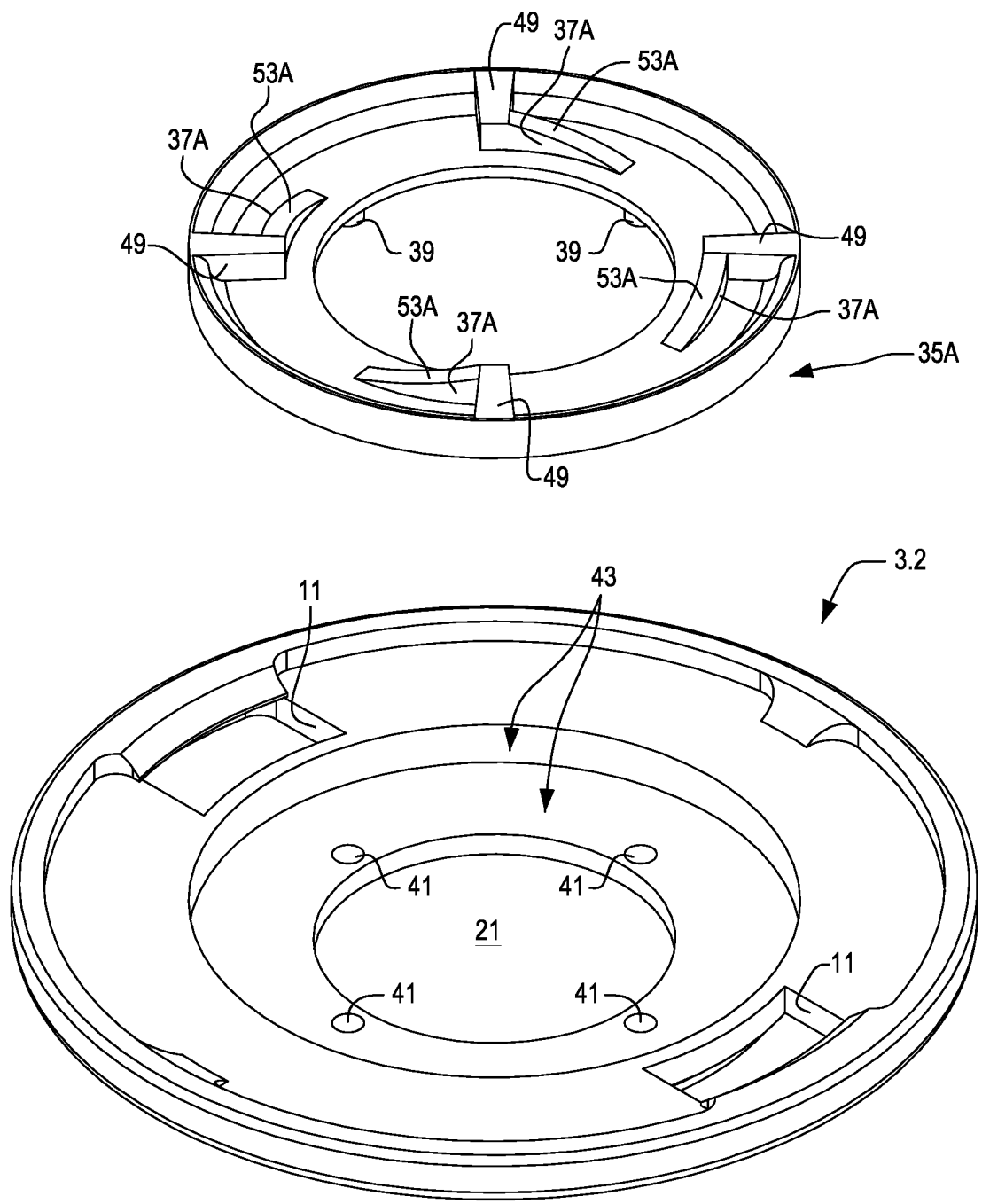
FIG. 22 illustrates an exploded view of the lower portion of the head in a second embodiment combined with a first ring member.
Figure 23:
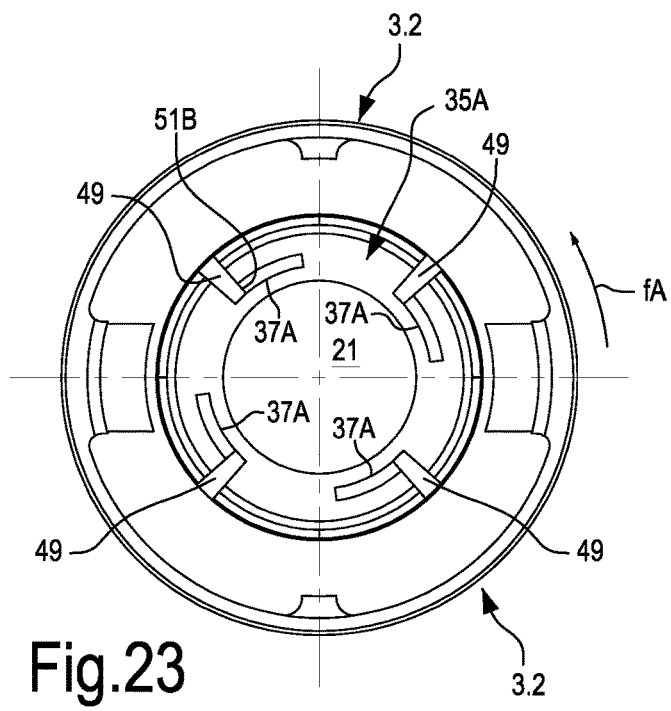
FIGS. 23 and 24 show a plan view of the portion of FIG. 22 with the first ring member and the second ring member mounted, respectively.
Figure 25:
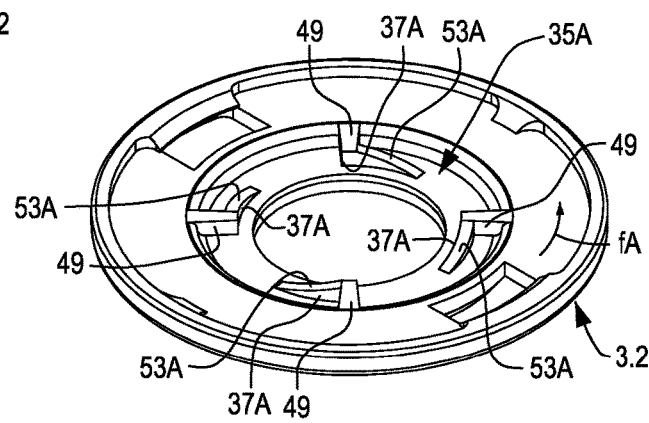
FIGS. 25 and 26 illustrate isometric views corresponding to the views of FIGS. 23 and 24.
Figure 27:
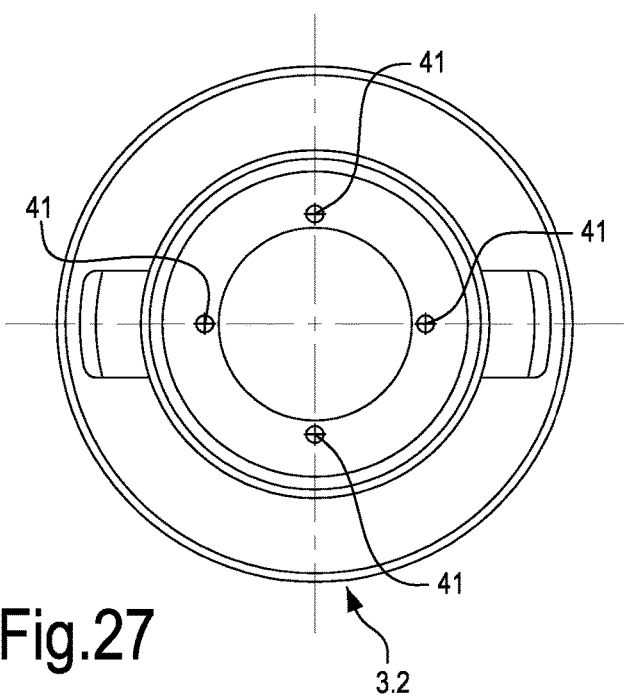
FIGS. 27 and 28 illustrate bottom views of the lower portion of the housing of FIGS. 23 and 24.
Figure 24:
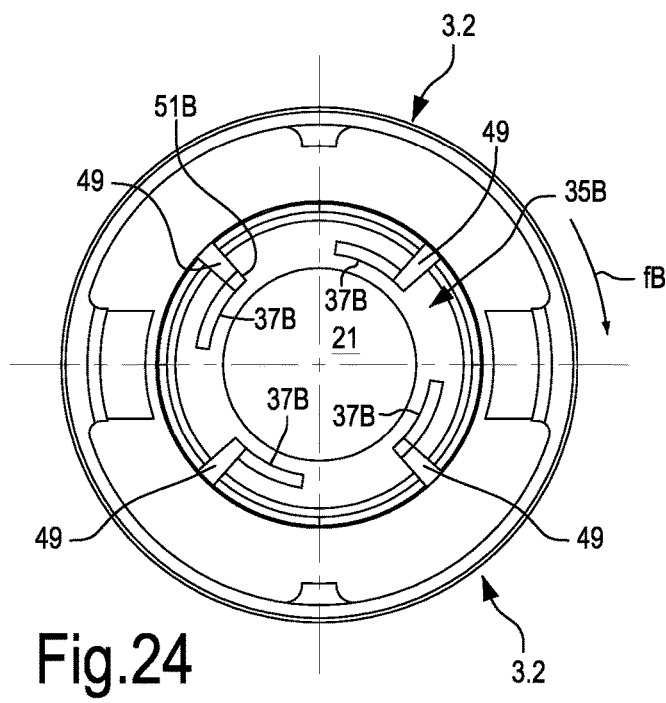
Figure 26:
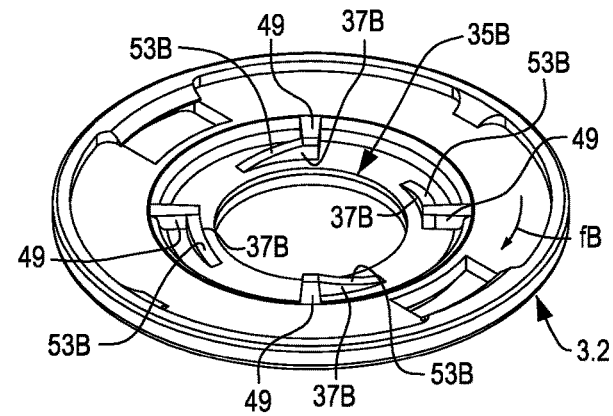
Figure 28:
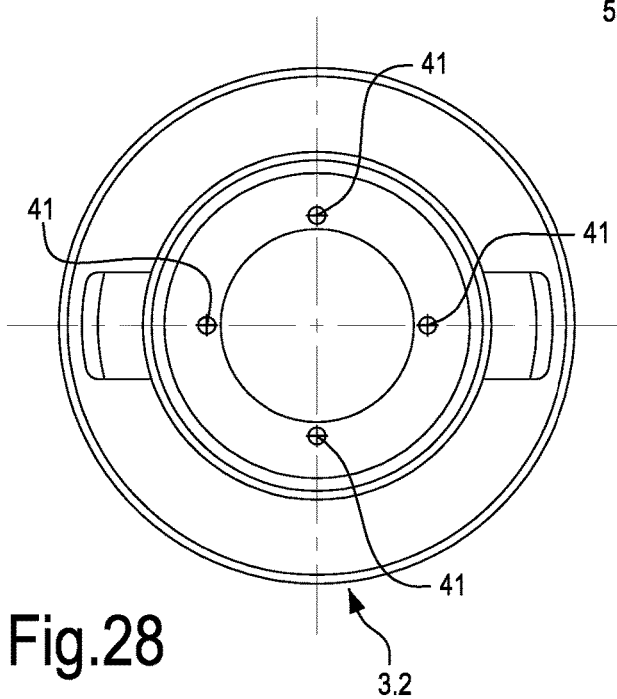
Figure 33:
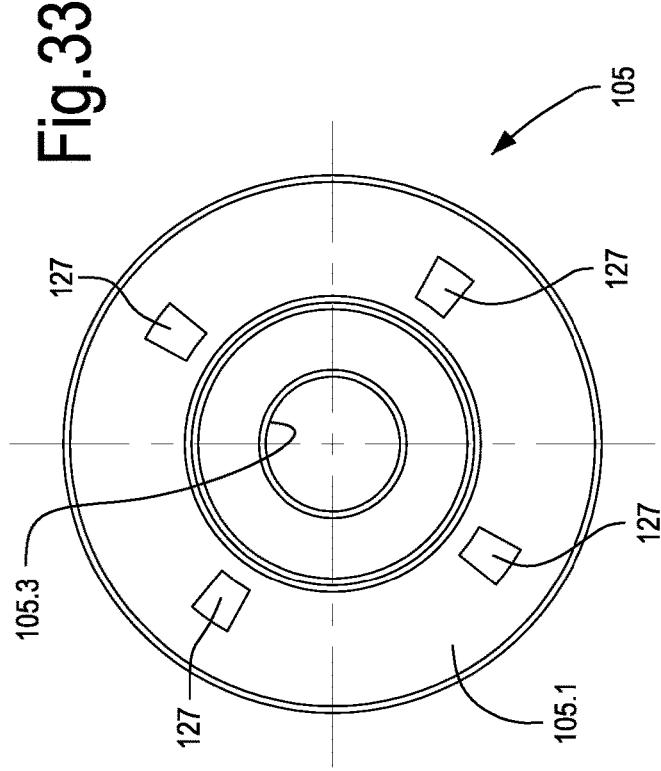
FIGS. 33 and 34 illustrate top and bottom views of the spool of FIGS. 31 and 32.
Figure 34:
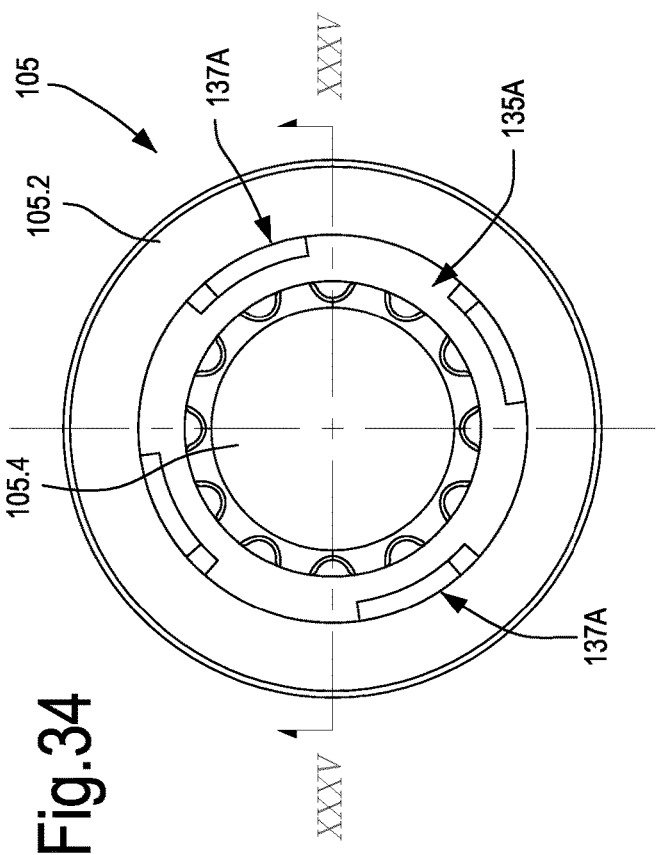
Figure 35:
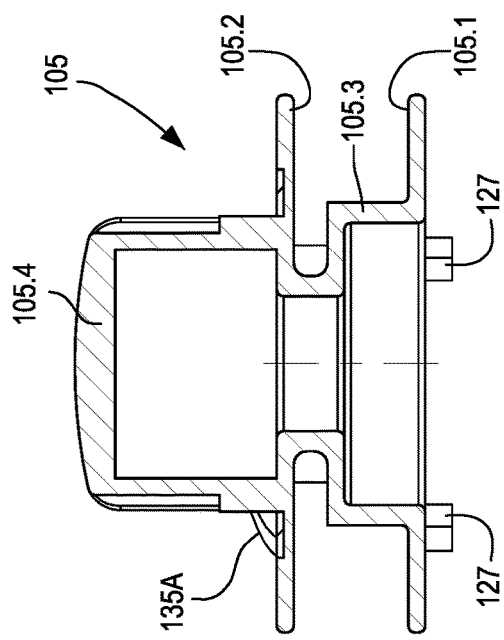
FIG. 35 illustrates a section according to the line XXXV-XXXV of FIG. 34.

From the above description, it is clear that when the ring member 35B is arranged in the housing 3, the spool 5 can rotate with respect to the housing 3 according to the arrow fB, see in particular FIGS. 17 and 19, but it cannot rotate in the opposite direction because the projections 29 abut against the flat surfaces or abutment edges 51B formed by the inclined teeth 37B and against the projections 49.

The rotation of the spool 5 in the direction opposite to arrow fB is possible, in this case, by axially moving the spool 5 against the thrust of the spring 59 pressing (arrow f5) against the portion 5.4 of the spool 5 which projects at the bottom from the trimmer head 1.

Substantially, with a set comprising a trimmer head 1 provided with a housing 3 and a spool 5, and two interchangeable ring members 35A and 35B, it is possible to fit out the trimmer head 1 alternatively in the configuration of FIGS. 15, 16 and 18, or in the configuration of FIGS. 17 and 19 so that the head can be used on trimmer apparatuses with drive shaft having clockwise or anticlockwise rotation, selectively.

The two ring members 35A and 35B can be made of materials of different colors, for example polymers of different colors. For example, the ring member 35A can be made in red and the ring member 35B in black or vice versa and preferably in a color different than that of the lower portion 3.2 of the housing 3.

Figure 20:
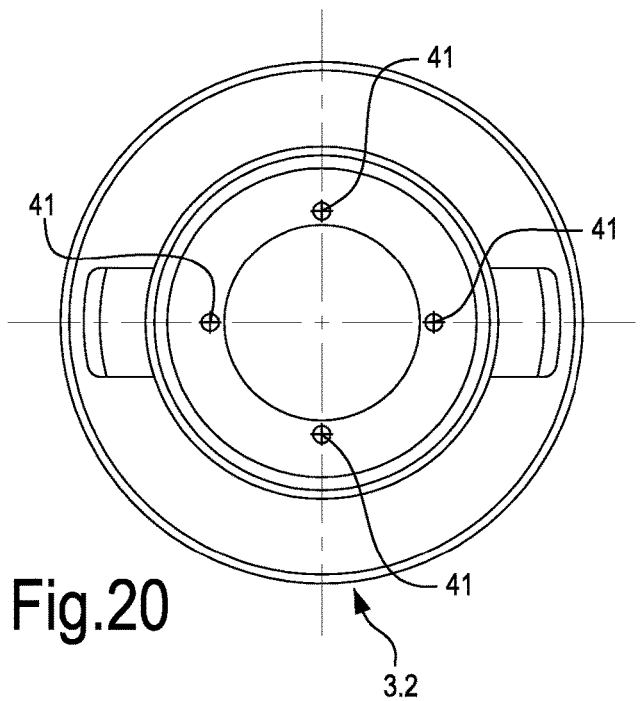
FIGS. 20 and 21 illustrate bottom views of the lower portion of the housing of FIGS. 16 and 17.
Figure 21:
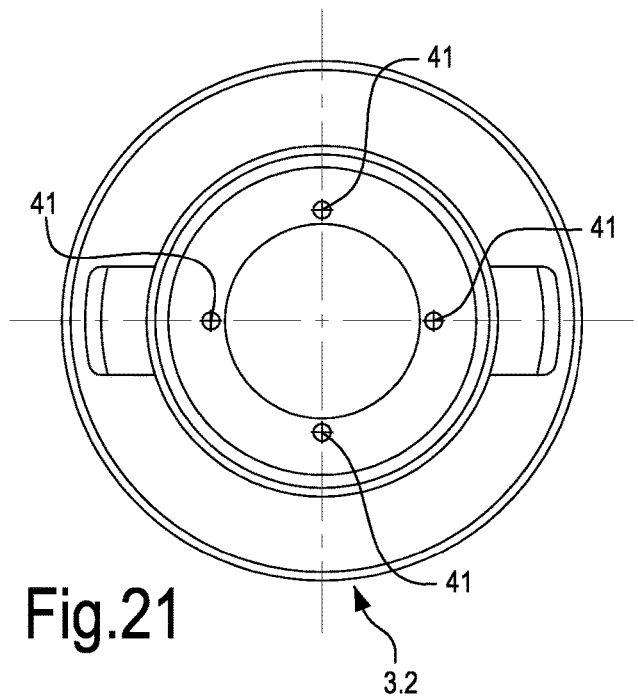

In this way the user can choose in a user-friendly manner one or the other of the two ring members 35A, 35B according to the rotation direction of the drive shaft of the trimmer apparatus in his/her possession. Thanks to the through holes 41, as can be seen in FIGS. 20 and 21, the user can check which of the two ring members 35A, 35B has been mounted without having to open the trimmer head 1. In fact, the pins 39 of the respective ring member 35A or 35B can be seen from the outside through the through holes 41.

By providing a ring member 35A, 35B separate from the lid or lower portion 3.2 of the housing 3, for manufacturing the ring member 35A, 35B a polymeric material of better quality can be used, which is subject to less wear by the action of the projections 29 of the spool 5 on it. This is particularly important since the rotation according to the arrow fA or fB of the spool 5 with respect to the ring member 35A or 35B causes sliding with considerable friction of the projections 29 on the ramps or inclined sides 53A, 53B. If a poor-quality material is used for manufacturing the ring members 35A, 35B, the latter would be subject to excessively rapid wear.

On the other hand, more resistant polymeric material has a higher cost and it is therefore advantageous to limit the use thereof only to the production of the two ring members 35A, 35B. Vice versa the remaining parts of the housing 3 of the trimmer head 1, in particular the upper portion 3.1 and the lower portion or lid 3.2, can be made of lower quality polymeric material which therefore is less expensive. In this way a substantial advantage is obtained compared to other solutions in which the inclined surfaces or ramps of the inclined teeth are formed in one piece with the lid of the housing 3 of the trimmer head.

Furthermore, compared to solutions in which the two sets of inclined teeth (for use with clockwise and anticlockwise rotation trimmer apparatus) are provided on the same member, which must be mounted in one direction or the other, the risks of incorrect assembly and relative consequences are reduced. In fact, the user who has a clockwise rotation trimmer apparatus can purchase a trimmer head 1 with two interchangeable ring members 35A, 35B, and mount on the trimmer head the one corresponding to the type of trimmer apparatus in question. Once the correct ring member has been mounted, the other can be eliminated, avoiding the risk of incorrect assembly.

For the manufacturer of trimmer heads, it is possible to offer the market kits each comprising a trimmer head and two interchangeable ring members 35A, 35B, with which it is possible to use the trimmer head indifferently on trimmer apparatuses with clockwise or anticlockwise rotation. This avoids the need to produce, store and distribute trimmer heads of two different types for the two possible rotation directions of the trimmer apparatus engines.

FIGS. 22 to 28 show, similarly to FIGS. 15 to 21, an embodiment in which the ring member, again indicated by 35A or 35B, has a radial dimension larger than the one described above and in which the projections 49 are formed on the ring member 35A or 35B, rather than on the lower portion or lid 3.2 of the housing 3. In this way, while maintaining a reduced dimension of the ring member 35A, 35B with respect to the lid or lower portion 3.2, with the above-mentioned advantages in terms of cost, all the abutment surfaces of the projections 29 are also made of a material with greater mechanical resistance.

While in the embodiments illustrated in FIGS. 1 to 28 projections are provided on the spool 5, which co-act with inclined teeth on the housing 3, an opposite configuration is also possible, where the inclined teeth are integral with the spool. Embodiments of this type are illustrated below with reference to FIG. 29 and following.

FIGS. 29 to 35 illustrate an embodiment of a spool, which can be used in a trimmer head similar to the one described with reference to FIGS. 1 to 28. The spool and the various parts thereof are indicated by the same reference numbers as those used in FIGS. 1 to 28 increased by "100". Therefore, the spool of FIGS. 29 to 35, indicated by 105, has two flanges 105.1 and 105.2 which extend circumferentially around a central body 105.3. The spool 105 furthermore has a lower portion 105.4 which, when the spool is inserted in a trimmer head 1, projects from the bottom thereof.

In the embodiment illustrated in FIGS. 29 to 35, projections 127 extend from the outer surface of the flange 105.1, said projections co-acting with corresponding abutments 31 of the upper portion 3.1 of the housing 3, in a manner substantially equivalent to what is illustrated in FIGS. 1 to 28.

Unlike the spool 5 illustrated in FIGS. 1 to 28, on the outer face of the flange 105.2 the spool 105 has an annular seat 128, rather than projections 29. The annular seat 128 surrounds the lower portion 105.4. In the annular seat 128 of the spool 105 one or the other of two ring members 135A, 135B can be housed. The ring members 135A, 135B can be seen in particular in FIGS. 29 and 31. Each ring member 135A, 135B has a ring 155A, 155B, with shape and dimension such as to fit into the annular seat 128 of the spool.

Each ring member 135A, 135B furthermore has a series of inclined teeth indicated by 137A for ring member 135A and by 137B for ring member 135B. Each inclined tooth 137A has front surfaces or edges 151A lying on a plane containing an axis of symmetry of the ring member 135A and therefore substantially orthogonal to the ring 155A, similarly to the surfaces or edges 51A. Each inclined tooth 137A further comprises inclined surfaces or inclined edges 153A which define ramps extending from the ring 155A towards the abutment surface or edge 151A. The inclined edges 153A have a function similar to the inclined edges 53A. The shape of the teeth 137A corresponds substantially to the shape of the teeth 37A described above.

The ring member 135B comprises similarly inclined teeth 137B symmetrical with respect to the inclined teeth 137A, with abutment surface or edges 151B and inclined surfaces or inclined edges 153B, with an arrangement similar to that described with reference to the ring member 35B.

The torsional coupling between annular seat 128 and ring member 135A, 135B can be guaranteed by coupling members not shown, for example front teeth, or pins projecting from the ring member 135A, 135B on the side opposite to the side from which the inclined teeth 137A, 137B project, said pins being inserted in holes provided in the bottom of the annular seat 128. In other embodiments, the ring member 135A, 135B can have radial tabs which are inserted in corresponding notches provided along the circumferential development of the annular seat 128.

FIGS. 30 and 32 illustrate the spool 105 with the ring members 135A and 135B respectively inserted in the seat 128. The inclined teeth 137B of the spool 105 co-act with projections 49 formed on the lower portion 3.2 of the housing 3 of the trimmer head 1 to perform substantially the same function as the one performed by the inclined teeth 37A, 37B in cooperation with the projections 29 of the spool 5 in the embodiments of FIGS. 1 to 28.

Therefore, by mounting on the spool 105 either one or the other of ring members 135A or 135B, spools are obtained which can be used with trimmer apparatuses having a drive shaft rotating in opposite directions, namely clockwise and anticlockwise.

FIGS. 36 to 42 illustrate a different embodiment of the spool 105. The same numbers indicate parts equal or equivalent to those already described with reference to the preceding FIGS. 29 to 35; said parts will not be described in detail again.

The main difference between the embodiment of FIGS. 29 to 35 and the embodiment of FIGS. 36 to 42 consists in that in the embodiment of FIGS. 36 to 42 the portion 105.4 of the spool 105 is formed as a component mechanically separate from the main body 105.3 and relative flanges 105.1 and 105.2. The portion 105.4 has pins 123 which are inserted in holes 125 provided in the main body 105.3 of the spool 105. The annular seat or groove 128 is provided in the main body 105.3 of the spool 105 and has a larger diameter than the diameter of the removable portion 105.4.

Figures 36, 37:
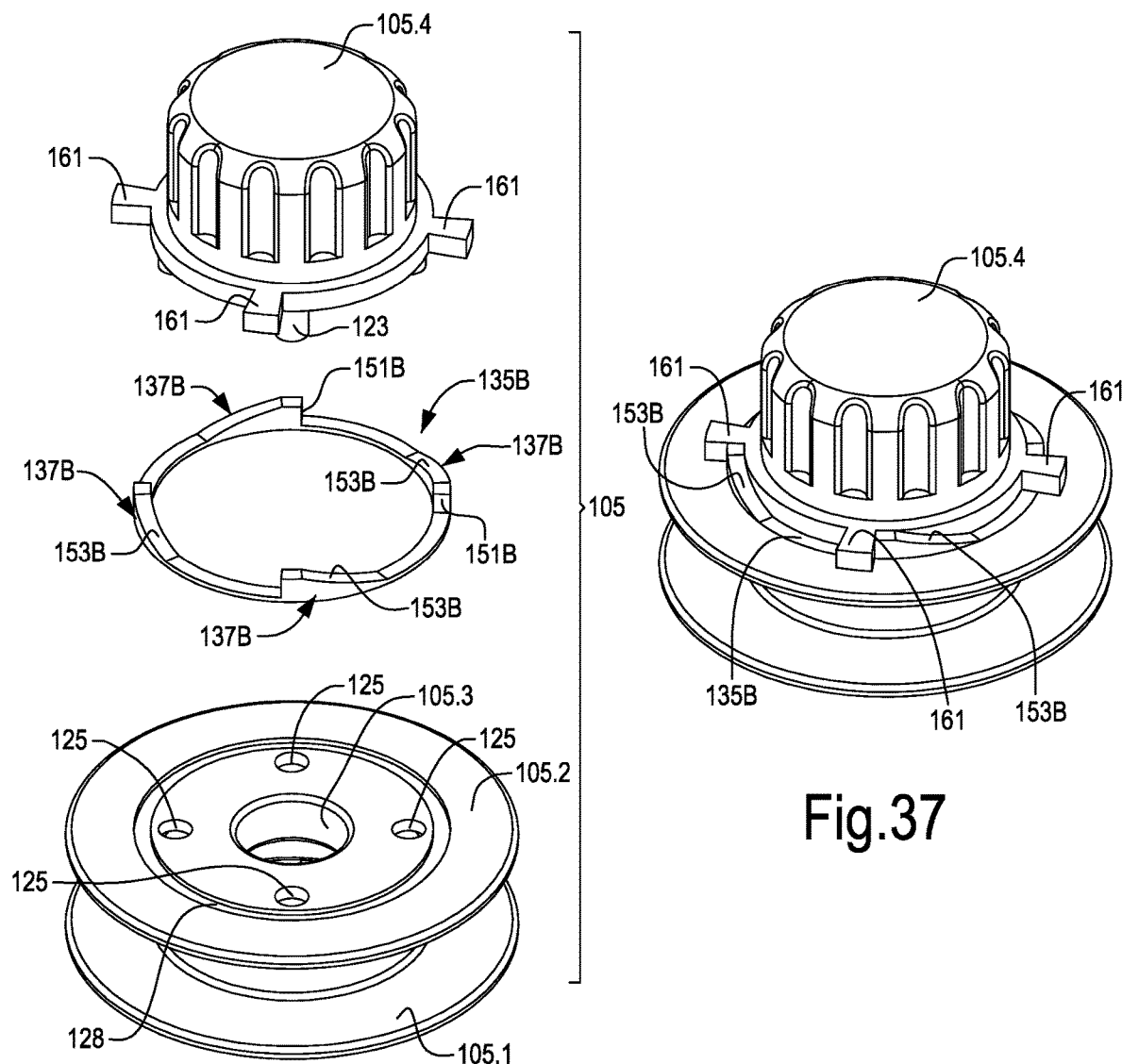
FIGS. 36 and 37 illustrate respectively an exploded view and a mounted view of a spool in a further embodiment with a first ring member.
Figures 38, 39:
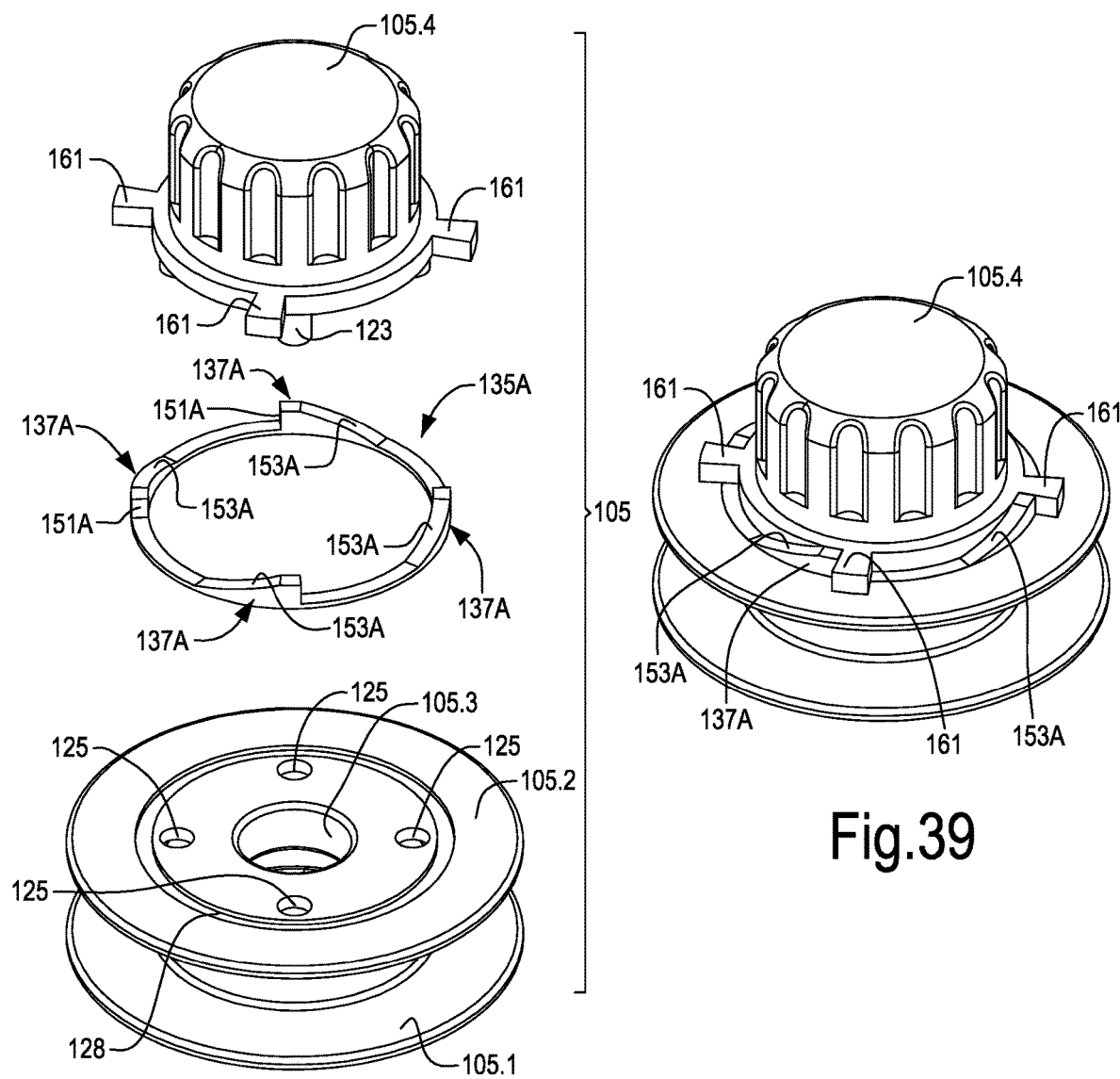
FIGS. 38 and 39 illustrate the spool of FIGS. 36 and 37 in views analogous to the views of FIGS. 36 and 37 with a second ring member.
Figure 40:
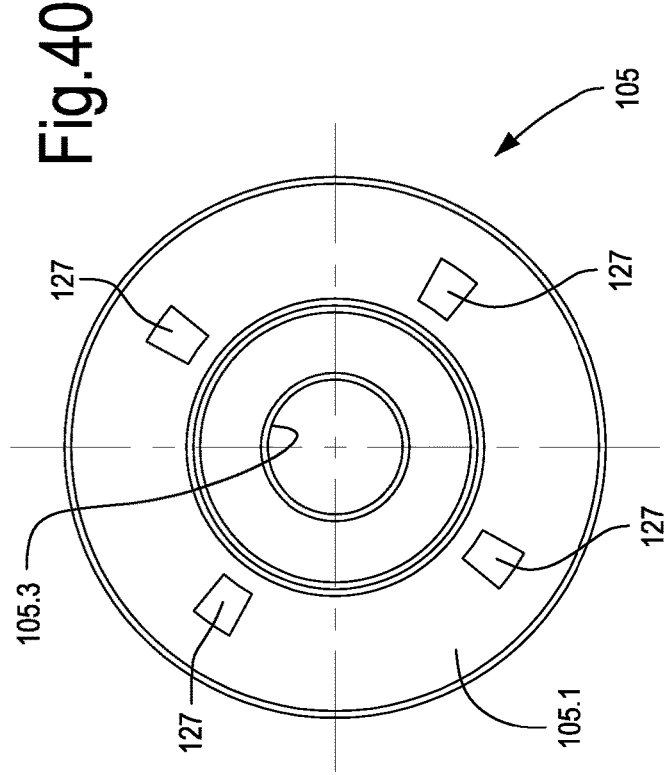
FIGS. 40 and 41 illustrate a top view and a bottom view of the spool of FIGS. 38 and 39.
Figure 41:
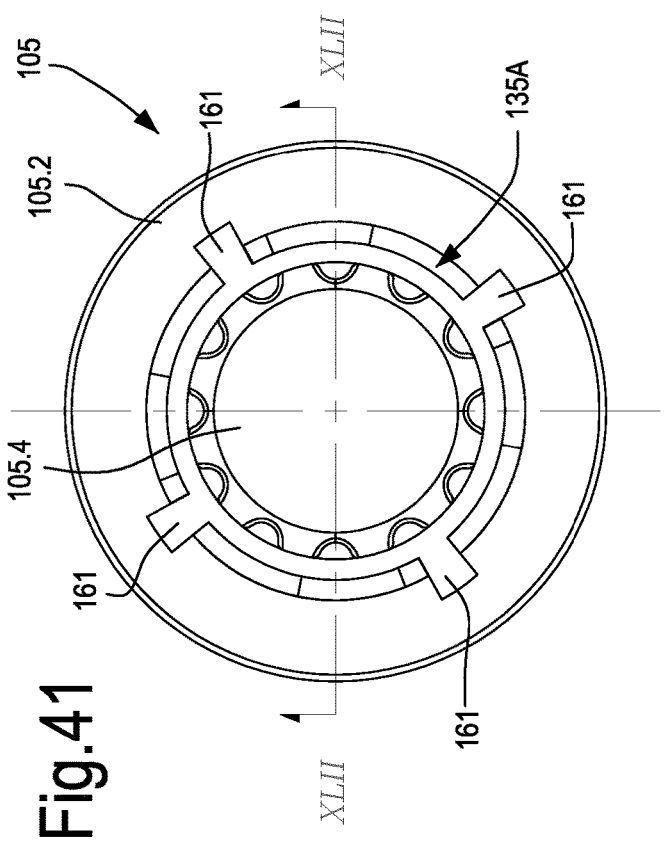
Figure 42:
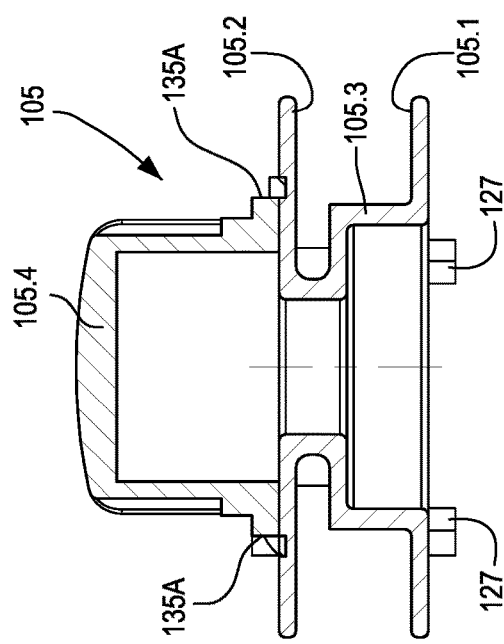
FIG. 42 illustrates a section according to the line XLII-XLII of FIG. 41.

In the embodiment illustrated in FIGS. 36 to 42, the removable portion 105.4 of the spool has radial projections 161. When the spool is mounted as illustrated in FIGS. 37 and 39, these projections abut against the front surfaces 151A or 151B of the respective ring member 135A or 135B. They form the projections that co-act with corresponding projections 49 of the lower portion 3.2 of the housing 3 of the trimmer head 1.

The ring members 135A and 135B have substantially the same shape as the one described and illustrated with reference to FIGS. 29 to 35, and the inclined teeth 137A and 137B thereof perform the function already described with reference to the inclined teeth 137A and 137B.

The radial dimension, namely the thickness in the radial direction of the ring members 135A, 135B of the embodiment of FIGS. 36 to 42 is smaller than the radial dimension of the homologous ring members 135A, 135B of FIGS. 29 to 35. In this way the amount of material necessary for manufacturing the ring members 135A, 135B in the embodiment of FIGS. 36 to 42 is less than the amount of material necessary for manufacturing the homologous ring members 135A, 135B of FIGS. 29 to 35.

Since, for the reasons illustrated above, it is expedient for the component material, for example a polymer, of the ring members 135A, 135B to be of superior quality with respect to the material used for the remaining parts of the trimmer head 1 and the components thereof, the embodiment of FIGS. 36 to 42 provides a reduction in the amount of higher quality, and therefore more expensive material required for manufacturing of the inclined teeth 137A or 137B.

The embodiments of the spools 5 and 105 described so far are used in trimmer heads of the "tap-and-go" type, namely those heads in which elongation of the portion of trimmer line F projecting from the openings 15 of the housing 3 of the trimmer head 1 is achieved by pressing on the ground the lower portion 5.4 or 105.4 of the spool 5 or 105, which projects from the trimmer head 1. However, trimmer heads also exist that do not have this function. The spool illustrated in FIGS. 43 to 49 has a shape such that it can be used in trimmer heads that do not have the "tap-and-go" function. In other respects, the spool of FIGS. 43 to 49 has substantially the same function as the spool 105 described with reference to the preceding figures. In FIGS. 43 to 49 equal or equivalent parts to those described with reference to FIGS. 1 to 28 are indicated by the same reference numbers incremented by "200".

In particular the spool of FIGS. 43 to 49 is indicated overall by 205. It comprises two flanges 205.1 and 205.2, which extend from a main body 205.3. On the outer face of the flange 205.1 projections 227 are provided, having a function similar to that of the projections 27 of the embodiment illustrated in FIGS. 1 to 28.

On the outer face of the flange 205.2 projections 261 are provided having a function similar to that of the projections 161 illustrated in FIGS. 29 to 42.

Figure 45:
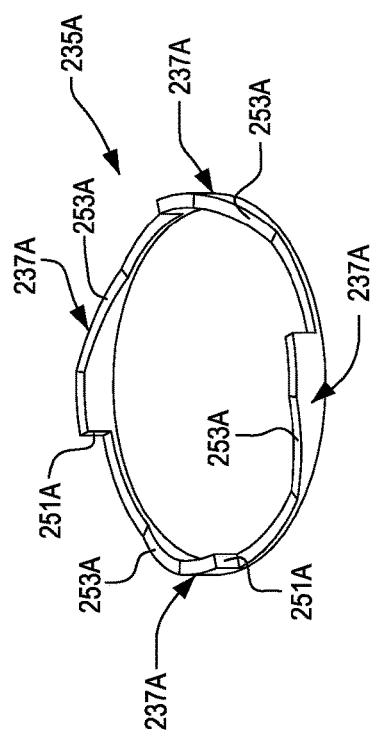

Furthermore, on the outer surface of the flange 205.2 a seat or annular groove 228 is provided, which can house one or the other of two ring members 235A and 235B, illustrated individually in FIGS. 45 and 43, respectively. The ring members 235A, 235B are provided with inclined teeth 237A, 237B. As described previously for the ring members 135A and 135B, the inclined teeth have front surfaces or front edges 251A, 251B lying on planes containing the axis of symmetry of the ring members and forming abutments co-acting with projections formed in the corresponding lower portion 3.2 of the housing 3 of the trimmer head 1. Each inclined tooth 237A, 237B furthermore has an inclined surface or inclined edge 253A, 253B, respectively. These inclined surfaces form ramps, which have the same function as the inclined surfaces or inclined edges 37A, 37B and 137A, 137B of the ring members 35A, 35B and 135A, 135B described previously.

Figure 46:
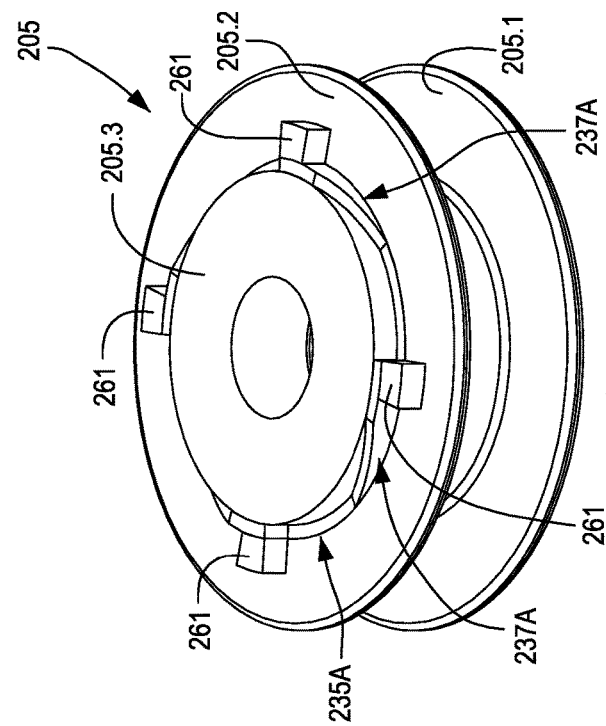
FIGS. 45 and 46 show views analogous to FIGS. 43 and 44 with a second ring member.

One or the other of the ring members 235A, 235B can be inserted in the groove or annular seat 228. The choice depends on the rotation direction of the drive shaft of the trimmer apparatus associated with the trimmer head 1 in which the spool 205 is inserted. FIGS. 43, 44 and 48 illustrate the spool 205 in which the ring member 235B is mounted. FIGS. 45, 46 illustrate the spool 205 in which the ring member 235B is inserted.

In the embodiment of FIGS. 43 to 49 on the outer face of the flange 205.2, in which the seat or groove 228 is provided, projections 261 are also formed having a function similar to the projections 161 described with reference to the embodiment of FIGS. 36 to 42.

In the embodiments illustrated in FIGS. 1 to 49 the trimmer head is configured with a housing 3 torsionally connectable to the shaft of a trimmer apparatus or other operating machine. In this way the rotation movement about the rotation axis A-A is transmitted from the shaft of the trimmer apparatus to the housing 3 of the trimmer head 1 and the spool positioned inside the housing 3 is rotated due to the coaction between projections or teeth of the spool and abutments (e.g. abutments 49; FIG. 15) of the housing.

In other embodiments the spool can be configured to be torsionally connected to the drive shaft of the trimmer apparatus or other operating machine. In this case the rotation movement is transmitted from the drive shaft to the spool and from the latter the movement is transmitted to the housing 3 by means of teeth and projections mutually cooperating between spool and housing.

Figure 50:
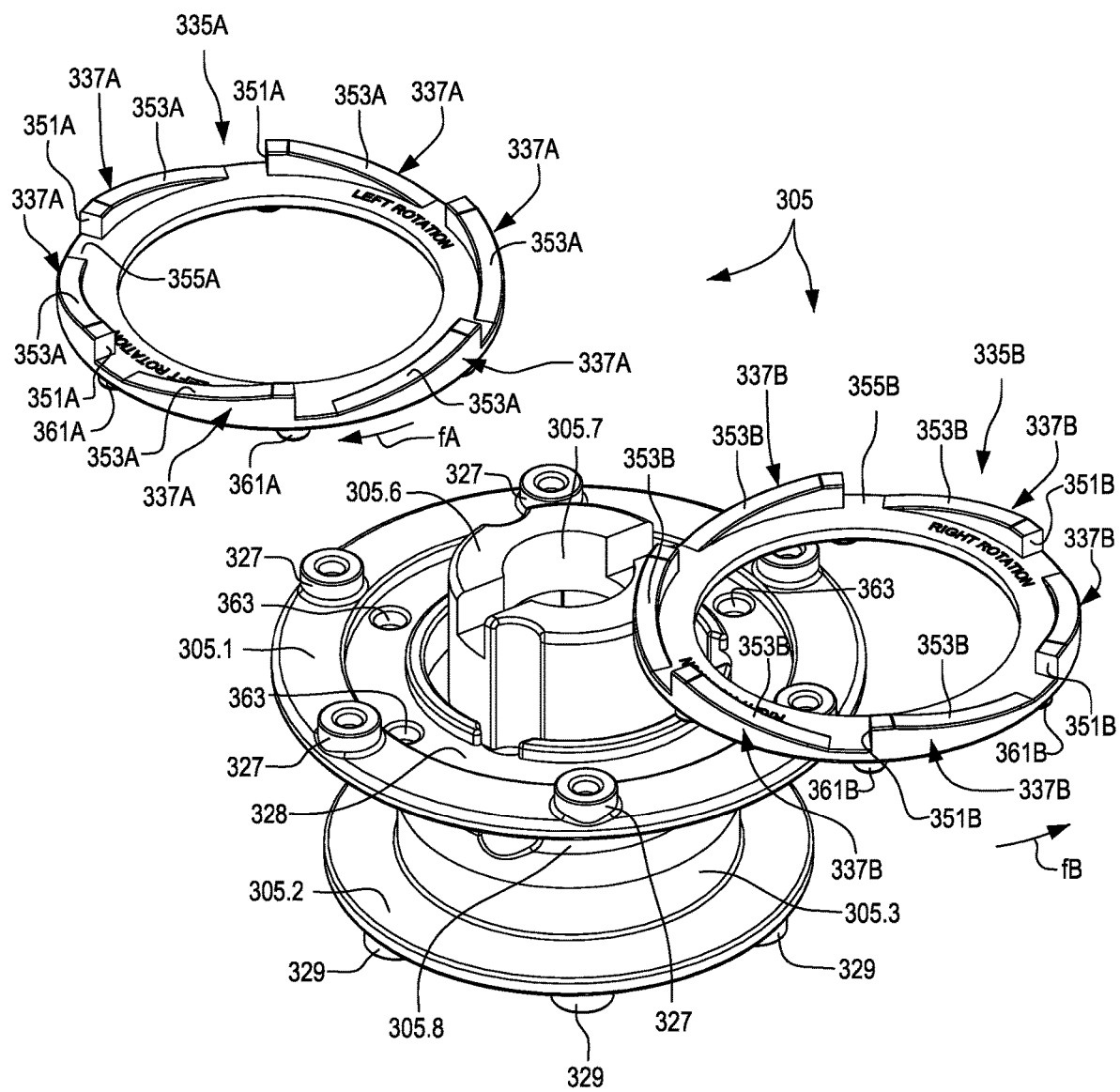
FIG. 50 illustrates an exploded isometric view of a kit formed of a spool and two interchangeable ring members in a further embodiment.
Figure 51:
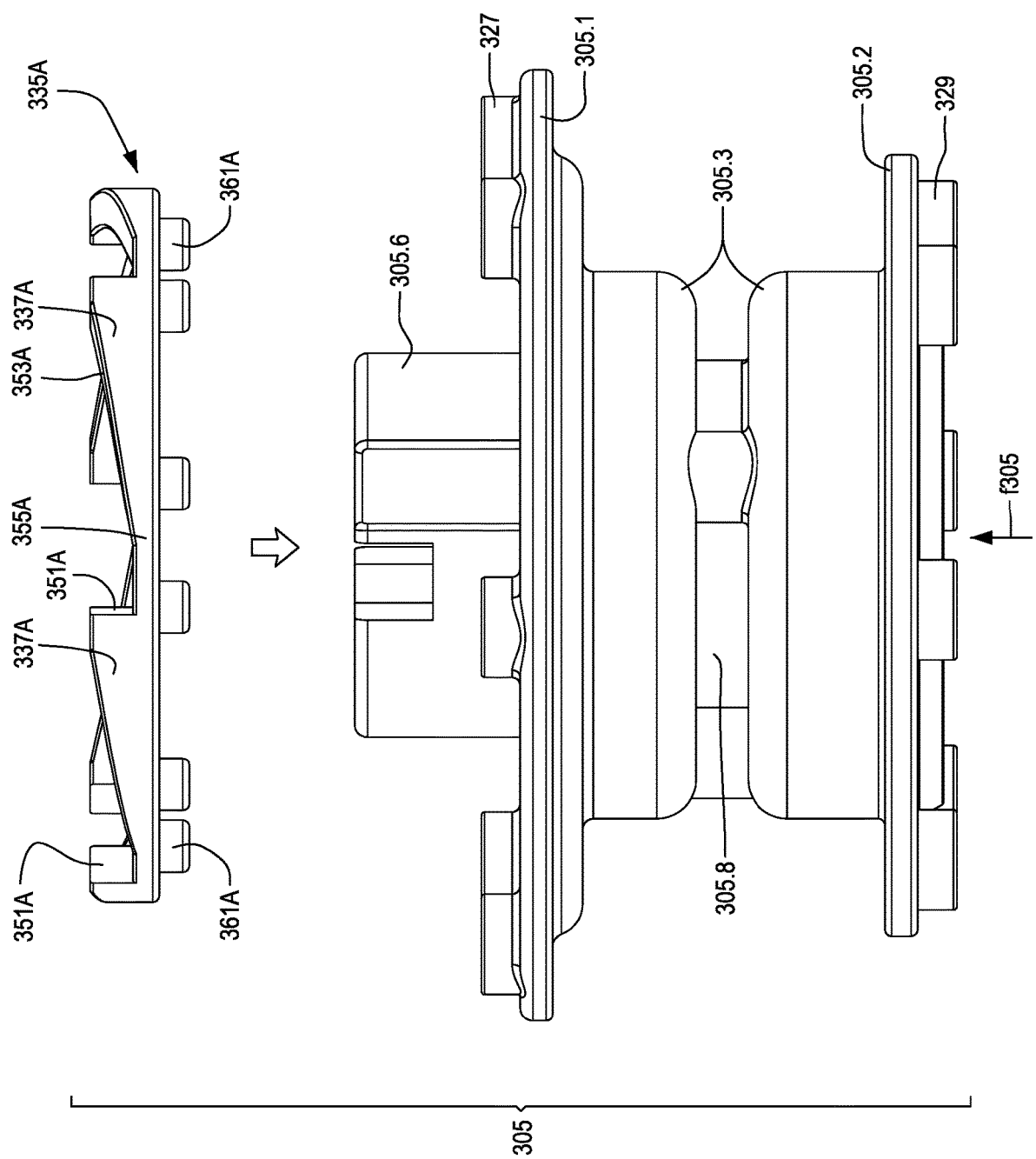
FIG. 51 illustrates a lateral view of the spool of FIG. 50 with one of the two ring members in the assembly phase.
Figure 52:
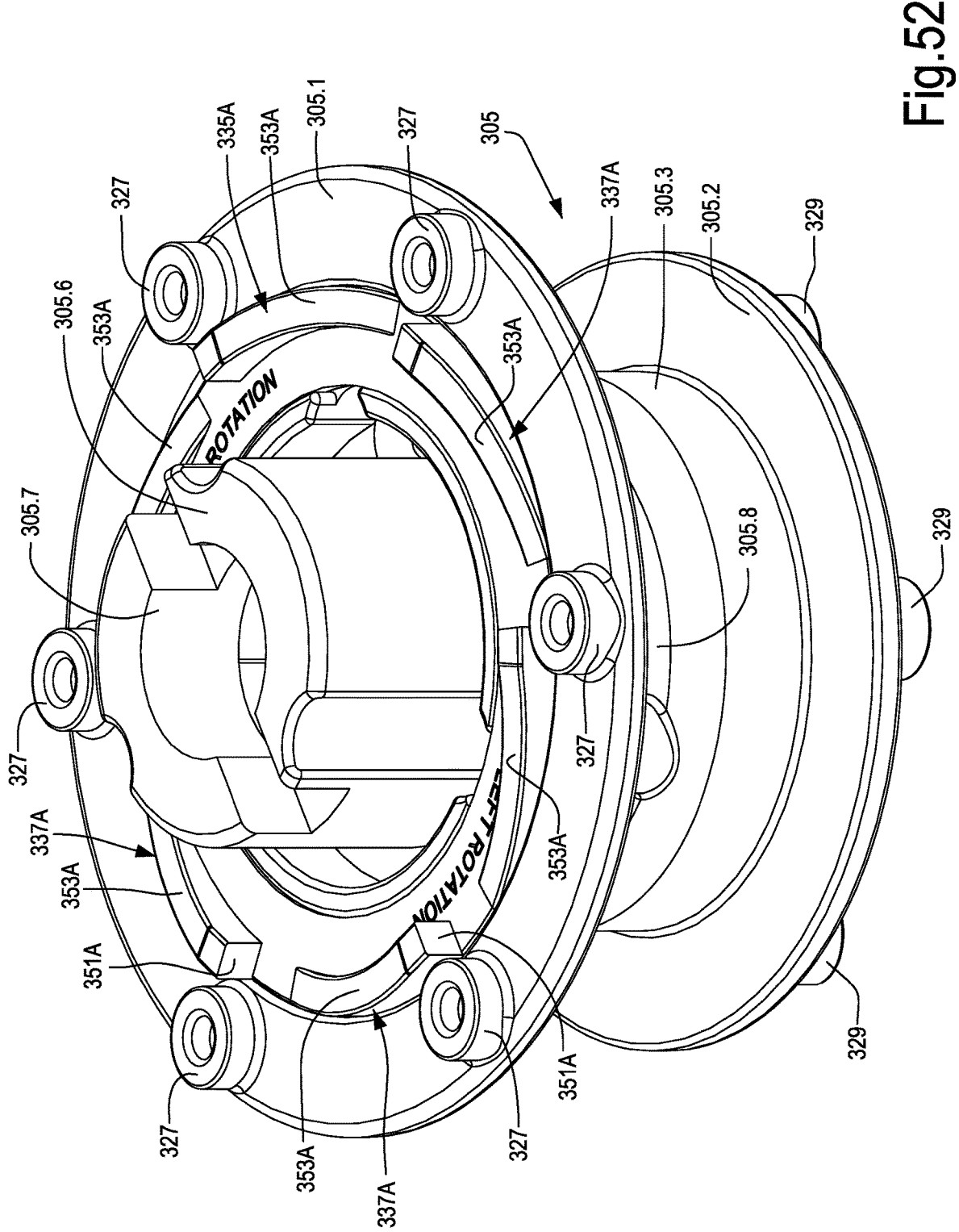
FIG. 52 illustrates an isometric view of the spool of FIG. 51 assembled.

FIGS. 50 to 52 show an embodiment of a spool according to the present disclosure, configured to be torsionally coupled to a drive shaft. The spool is indicated by 305 and has a first flange 305.1 and a second flange 305.2, which extend around a central body 305.3. From the central body 305.3, a tang 305.6 projects, which forms a connection element to a drive shaft (not shown) of a trimmer apparatus or other operating machine. The tang 305.6 can have an axial hole 305.7 in which a connection pin is inserted, and which performs a similar function as the hole 7 of the trimmer head 1 illustrated in the preceding figures. The spool 305 can thus be locked to the drive shaft and rotated.

The flange 305.1 has projections 327 co-acting with abutments of the head housing, corresponding to the abutments 31 of the trimmer head 1 described above. The flange 305.2 has projections 329 co-acting with abutments corresponding to the abutments 49 of the trimmer head 1 described above.

The number 305.8 indicates openings in the central body 305.3 of the spool 305, which serve to attach the trimmer line F, in a per se known manner.

The spool 305 is inserted in a housing 3 of the trimmer head so that the tang 305.6 faces upwards when the head is used for example to cut the grass on a lawn. In this case the trimmer head housing contains a compression spring corresponding to the spring 59, which is arranged between the flange 305.2 and the lower portion of the trimmer head housing. The spring biases the spool in a first operating position with respect to the head housing, with a thrust oriented according to the arrow f305 in FIG. 51. Since the spool 305 is fixed to the drive shaft of the trimmer apparatus, this arrangement is such that when the spring is pressed according to the arrow f305, the trimmer head housing moves with respect to the shaft of the trimmer apparatus in an axial direction. When the spring is compressed, the spool is set to a second operating position with respect to the housing.

Similarly to what is described with reference to the preceding FIG. 29 and following, the spool 305 can be equipped with one or the other of two alternative ring members, indicated in FIG. 50 by 335A and 335B. The ring members 335A and 335B correspond to the previously described ring members 135A, 135B and 235A, 235B. The ring member 335A has inclined teeth 337A, each of which has a surface or edge 351A parallel to the rotation axis of the trimmer head, when the latter is mounted with the spool and the ring member inside it. Therefore, the edge or surface 351A of each inclined tooth 337A lies on a plane containing the axis of the ring member 335A. Each inclined tooth 337A has an inclined surface or edge 337, which extends from a ring 355A with a suitable angle, for example between 5° and 30° and forms an ascent ramp, equivalent to the one defined by the inclined surfaces or edges 137A and 237A previously described.

Coupling elements for coupling the ring member 335A to the spool 305 extend from the surface of the ring 355A opposite the surface from which the inclined teeth 337A project. In the illustrated embodiment, these coupling elements comprise pegs 361A which are inserted into holes 363 provided on the bottom of an annular seat 328, analogous to the annular seats 128 and 228 described above. The annular seat 328 houses one or the other of the ring members 335A, 335B.

The ring member 335B is substantially equal to the ring member 335A and the components thereof are indicated by the same reference numbers as those used for the member 335A, but marked with the letter "B". These elements are not described again, or rather, are described only in terms of the differences between the two ring members 335A, 335B. The difference consists in that the inclined teeth 337B have an inclined surface or edge 353B oriented in the direction opposite to the inclined surface or edge 353A. In this way, the spool 305 can rotate with respect to the housing in which it is inserted in a clockwise direction according to the arrow fA, if the ring member 335A is applied on it, and alternatively according to the arrow fB if the ring member 335B is applied on it, analogously to the previous description.

FIG. 51 illustrates in a side view the assembly phase of the ring member 335A on the spool 305. FIG. 52 shows the spool 305 equipped with the ring member 335A, mounted in its annular seat 328.

What is claimed is:

1. A trimmer head for a rotary trimmer apparatus, comprising:
 a housing having a first end wall, a second end wall and a side wall extending between the first end wall and the second end wall and around a rotation axis of the housing;
 trimmer line exit openings in the side wall;
 a spool, received in the housing and axially movable within said housing;
 a spring operatively connected to the spool and axially biasing the spool in a first operating position; and
 a kit comprising a first ring member and a second ring member configured to be mounted alternatively on the trimmer apparatus, said first ring member, having a first set of inclined teeth and configured to be coupled to one of said housing and said spool and co-acting with projections on the other of said housing and said spool, wherein said first set of inclined teeth and said projections are configured such that, when the first ring member is coupled to said one of the housing and the spool, the first set of inclined teeth and the projections prevent rotation of the spool with respect to the housing in a first rotation direction, and cause an axial displacement of the spool against the spring, away from the first operating position towards a second operating position, when the spool rotates in a second rotation direction with respect to the housing, said second ring member, having a second set of inclined teeth and configured to be coupled to said one of said housing and said spool and co-acting with the projections on the other of said housing and said spool, wherein said second set of inclined teeth and said projections are configured such that, when the second ring member is coupled to said one of the housing and the spool, the second set of inclined teeth and the projections prevent rotation of the spool with respect to the housing in the second rotation direction, and cause an axial displacement of the spool against the spring, away from the first operating position towards a second operating position, when the spool rotates in the first rotation direction with respect to the housing, wherein each said first inclined teeth and second inclined teeth has a first edge substantially orthogonal to a plane parallel to the ring member, and a second edge, forming an angle smaller than 90° and larger than 0° with said plane parallel to the ring member, wherein the first ring member and the second ring member are configured to be alternatively constrained to one of the first end wall and the second end wall of the housing, and wherein said end wall to which the first ring member and the second ring member are configured to be alternatively constrained is provided with a plurality of projections, operatively associated to the inclined teeth of the first ring member and second ring member; and wherein when the first ring member or the second ring member is constrained to the housing, the first edges are approximately flush with said projections.

2. The trimmer head of claim 1, wherein the first ring member and the second ring member are configured to be alternatively constrained to the housing.

3. The trimmer head of claim 2, wherein one of said first end wall and said second end wall of the housing is formed by a removable lid, and wherein the first ring member and the second ring member are configured to be alternatively constrained to said lid.

4. The trimmer head of claim 2, wherein the first ring member and the second ring member are provided with respective pegs projecting from the ring member and extending therefrom opposite to the respective inclined teeth, the pegs being adapted to be introduced in through holes formed in one of said first end wall and second end wall of the housing.

5. The trimmer head of claim 1, wherein the first ring member and the second ring member are provided with respective pegs, projecting from the ring member and extending therefrom opposite to the respective inclined teeth, the pegs being adapted for insertion in respective holes of said one of said housing and said spool.

6. The trimmer head of claim 1, wherein each second edge forms with said plane parallel to the ring member an angle comprised between about 5° and about 30°.

7. The trimmer head of claim 1, wherein the first ring member and the second ring member are configured to be alternatively constrained to one of the first end wall and the second end wall of the housing, and wherein said end wall is provided with a plurality of projections, operatively associated to the inclined teeth of the ring member constrained thereto.

8. The trimmer head of claim 1, wherein the spool is provided with first spool projections on a first axial end thereof and second spool projections on a second axial end thereof, wherein the first spool projections co-act with first housing projections arranged at the first end wall of the housing and the second spool projections co-act with second housing projections arranged at the second end wall of the housing.

9. The trimmer head of claim 1, wherein the spool comprises a central core, a first flange radially extending from said central core, and a second flange radially extending from said central core, a trimmer line winding space being formed between the first flange and the second flange.

10. The trimmer head of claim 9, wherein an operating knob projects axially from one of said first flange and said second flange, wherein one of said first end wall and second end wall of the housing has an aperture, through which the operating knob projects from the housing.

11. The trimmer head of claim 1, wherein the first ring member and the second ring member have different colors.

* * * * *